(12) United States Patent
Lo et al.

(10) Patent No.: US 8,472,101 B2
(45) Date of Patent: Jun. 25, 2013

(54) DUAL DISPLAY

(75) Inventors: Kuo-Lung Lo, New Taipei (TW); Pei-Ju Su, Hsinchu (TW); Wei-Yuan Cheng, New Taipei (TW); Jyh-Wen Shiu, Hsinchu County (TW); Hsin-Hung Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/196,428

(22) Filed: Aug. 2, 2011

(65) Prior Publication Data

US 2011/0286073 A1   Nov. 24, 2011

Related U.S. Application Data

(63) Continuation-in-part of application No. 12/691,619, filed on Jan. 21, 2010, now Pat. No. 8,014,054.

(30) Foreign Application Priority Data

Jun. 8, 2009   (TW) .............................. 98118999 A

(51) Int. Cl.
G02B 26/02 (2006.01)
G02F 1/03 (2006.01)

(52) U.S. Cl.
USPC ............................ 359/228; 359/245; 359/253

(58) Field of Classification Search
USPC ................. 359/228, 245, 253, 254, 290–292, 359/316, 250, 252; 345/84, 87, 88, 105, 107
See application file for complete search history.

(56) References Cited

U.S. PATENT DOCUMENTS

| 6,466,292 B1 | 10/2002 | Kim |
| 2006/0103909 A1 | 5/2006 | Benning et al. |
| 2007/0139590 A1 | 6/2007 | Kim et al. |
| 2009/0103159 A1 * | 4/2009 | Cheng et al. .................. 359/228 |

FOREIGN PATENT DOCUMENTS

| TW | 590231 | 6/2004 |
| TW | I244057 | 11/2005 |
| WO | WO 2005/098524 A1 | 10/2005 |
| WO | WO 2006/017129 A2 | 2/2006 |
| WO | WO 2008/142085 A2 | 11/2008 |

OTHER PUBLICATIONS

Taiwan Patent Office, Office Action, Patent Application Serial No. 098118999, Mar. 15, 2013, Taiwan.

* cited by examiner

Primary Examiner — Tuyen Tra

(57) ABSTRACT

A dual display is disclosed, including a first substrate and a second substrate comprising a plurality of pixels, wherein each pixel comprises a plurality of subpixels. The first substrate comprises a reflective region and a transmissive region for each subpixel, and a first color fluid is movable by an electric field on the reflective region and the transmissive region of a first subpixel, wherein when the first color fluid covers the transmissive region, the dual display provides a first viewing side at the first substrate side under a transmissive mode, and when the first color fluid covers the reflective region or covers the reflective region and the transmissive region, the dual display provides a second viewing side at the second substrate side under a reflective mode.

16 Claims, 32 Drawing Sheets

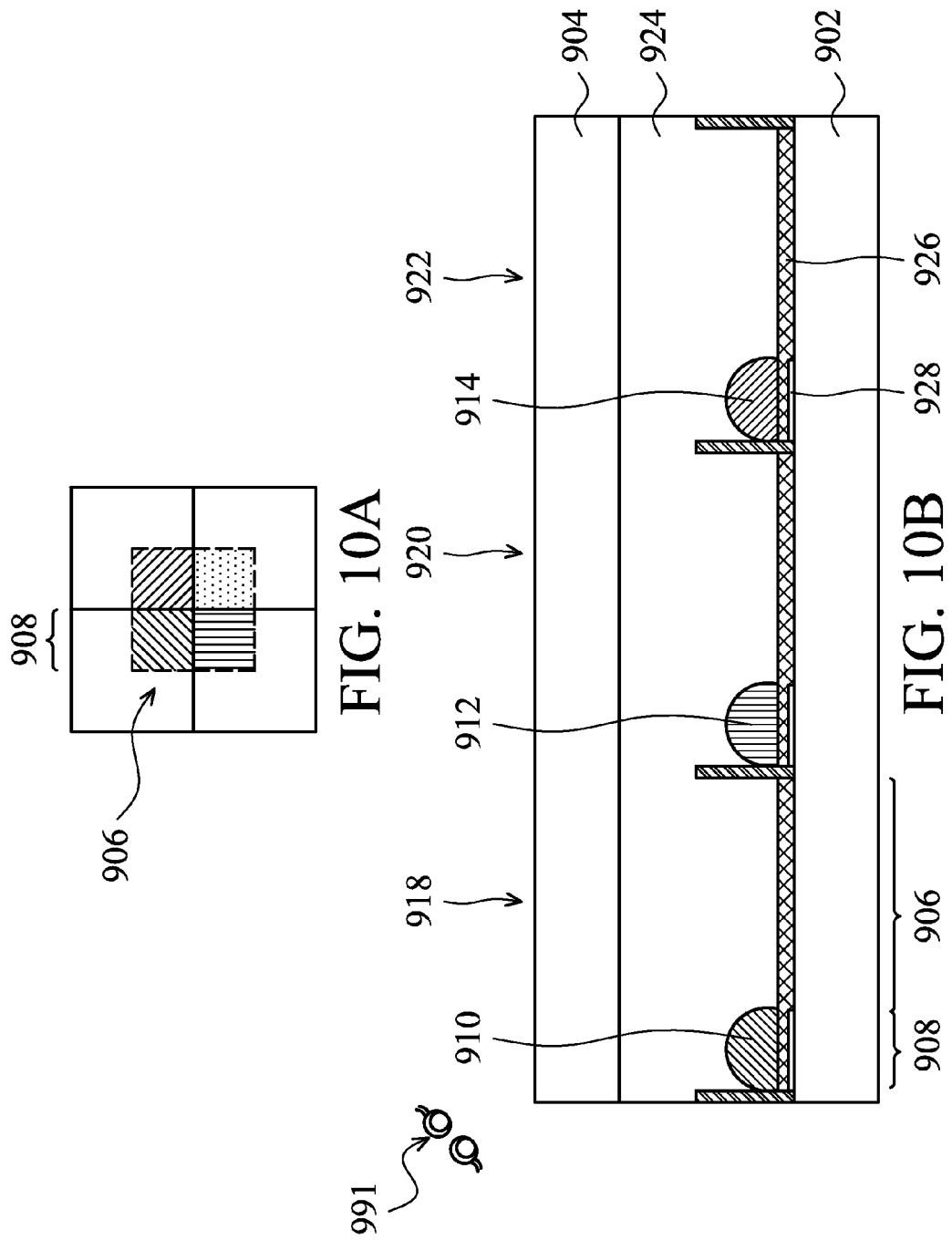

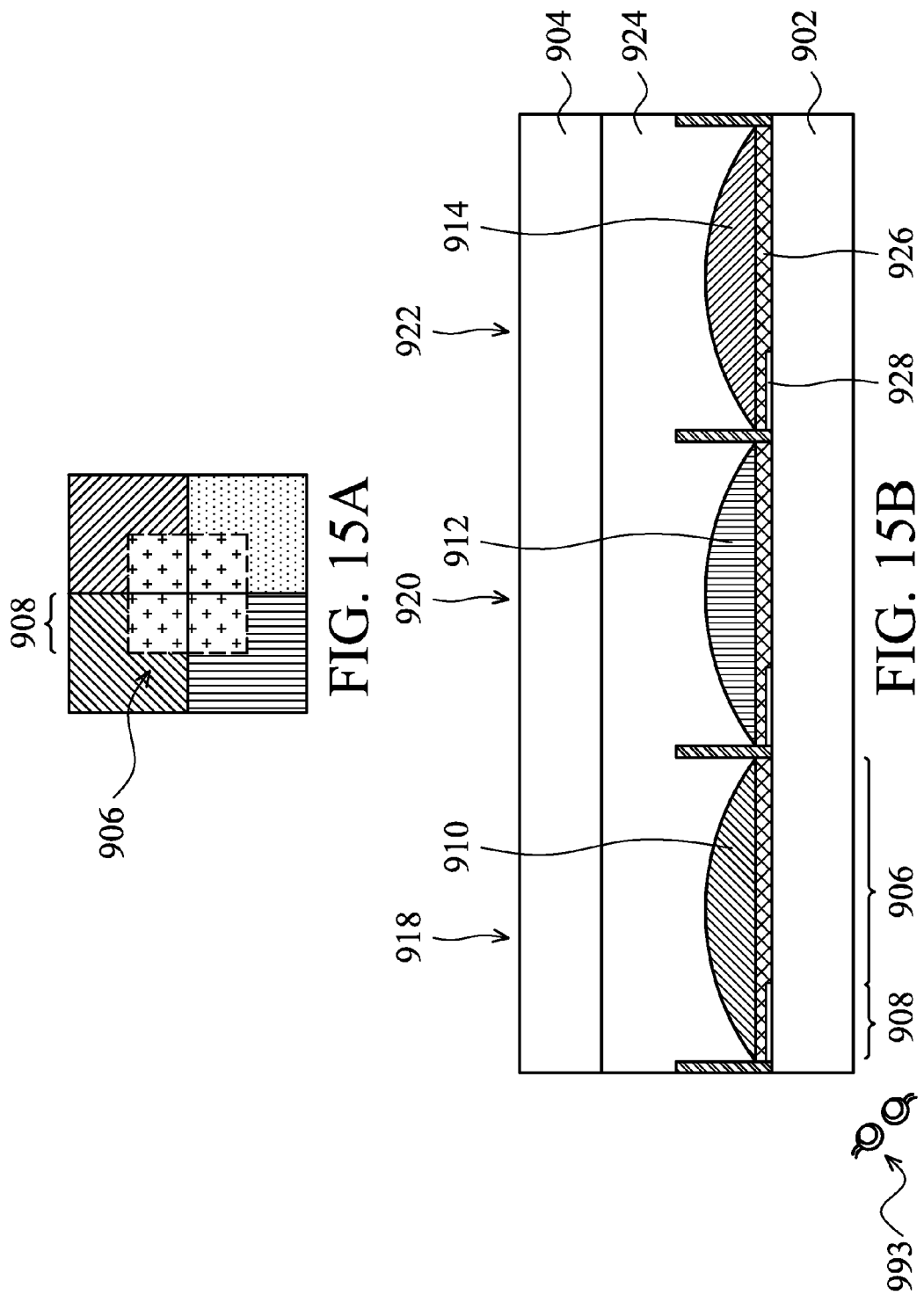

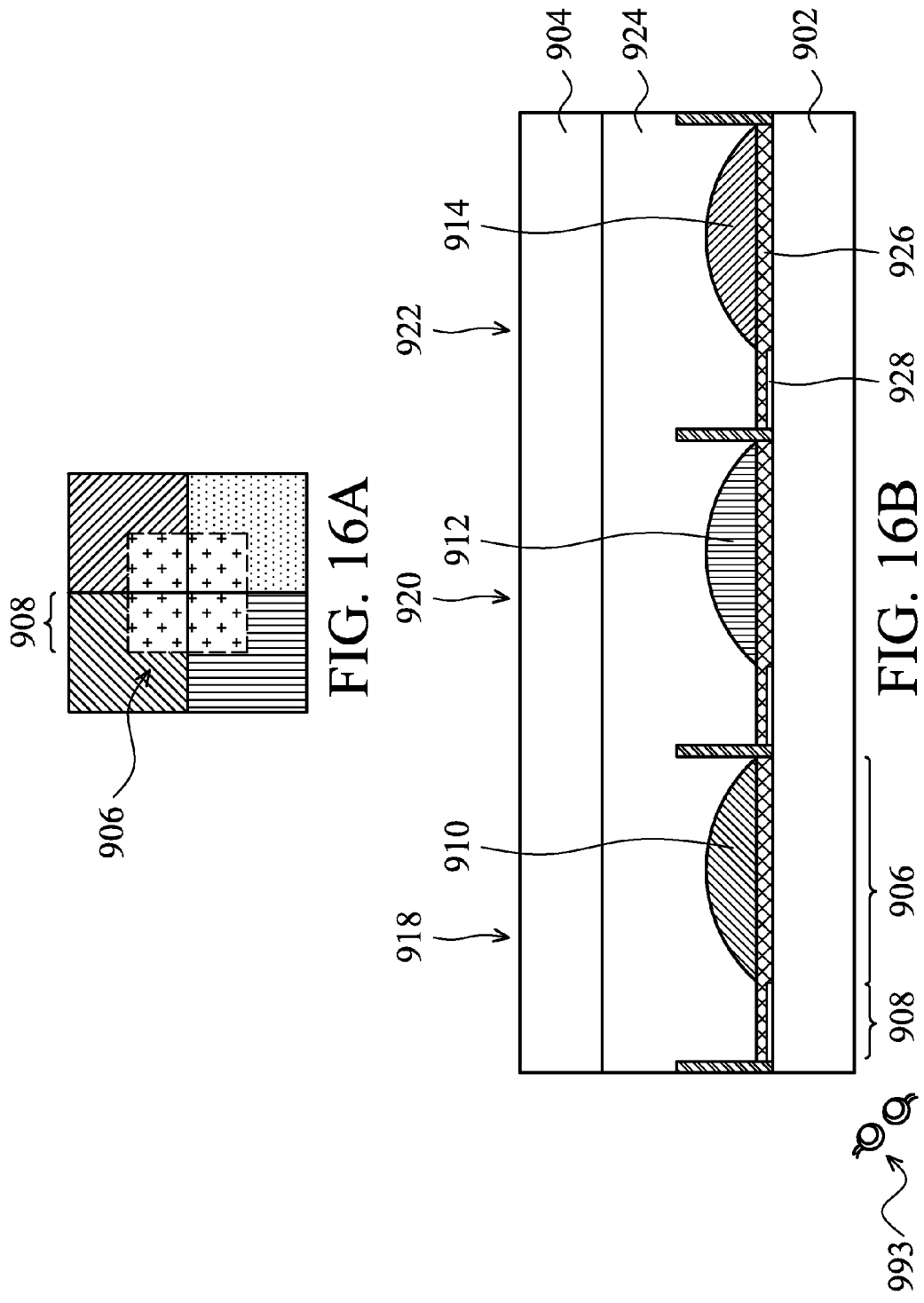

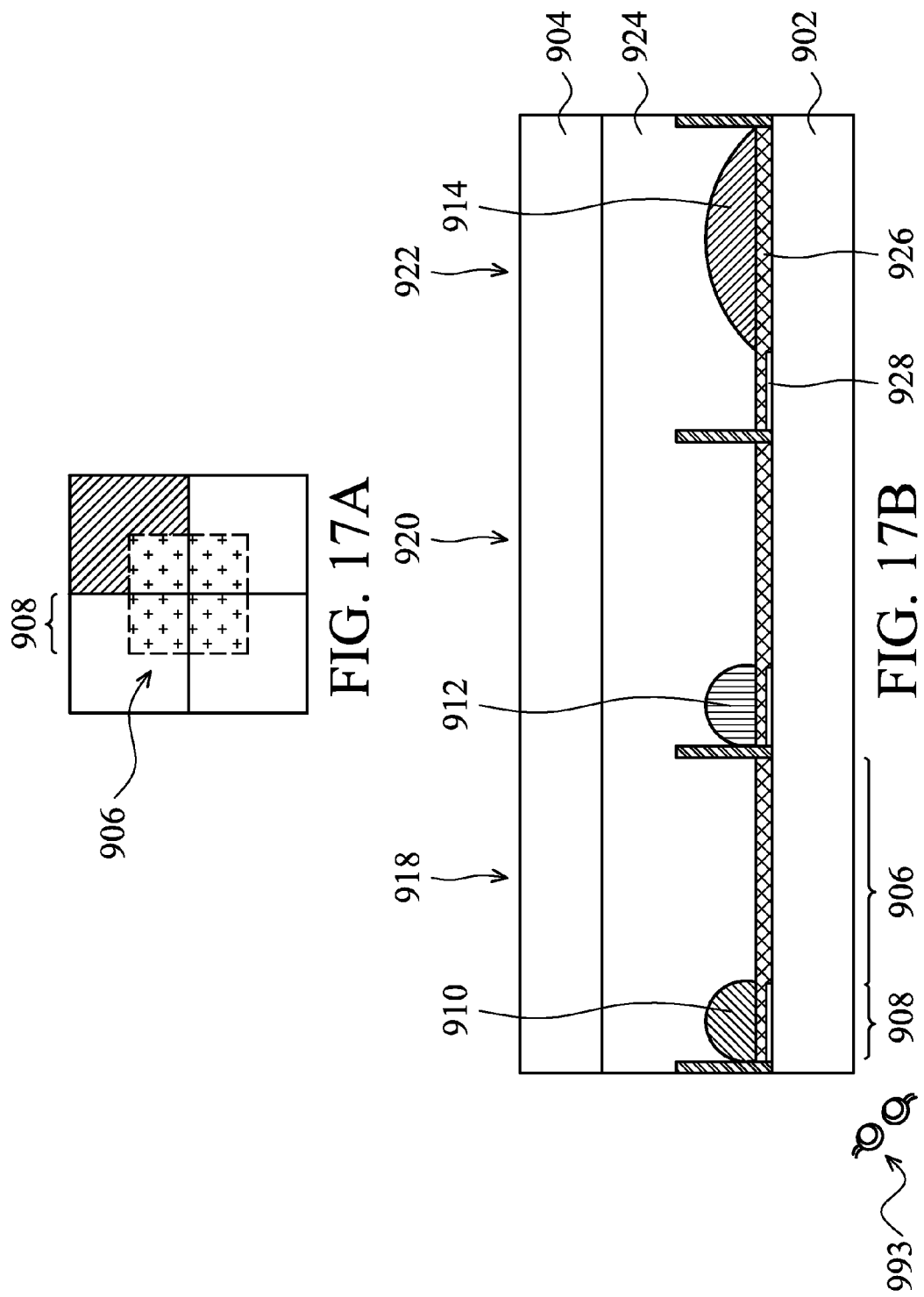

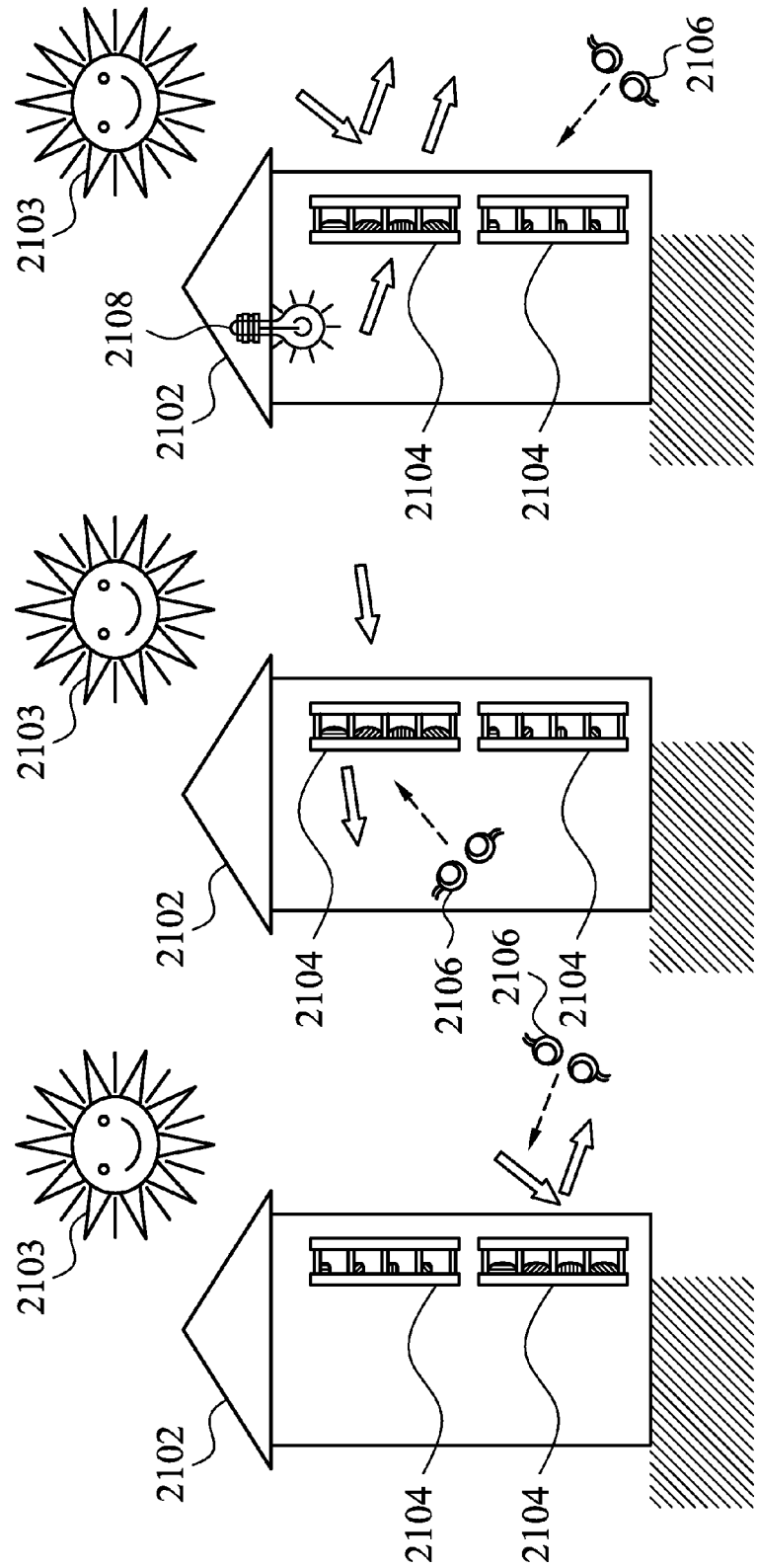

DUAL DISPLAY

BACKGROUND OF THE INVENTION

This application is a Continuation-In-Part of U.S. patent application Ser. No. 12/691,619, filed Jan. 21, 2010 and entitled "Dual display," now U.S. Pat. No. 8,014,054. This application claims priority of Taiwan Patent Application No. 98118999, filed on Jun. 8, 2009, the entirety of which is incorporated by reference herein.

1. Field of the Invention

The invention relates to a display with dual displaying function and more particularly to a dual display with two viewing sides.

2. Description of the Related Art

Currently, thin displays are widely used. Most displays, however, do not have a dual displaying function. For example, WO. 2005098524 discloses an electrowetting display structure, WO 2006017129 discloses a transflective electrowetting display structure, and WO 2008142085 discloses an electrowetting display device with an element for switching between transmissive or transflective states. However, the techniques do not provide a dual displaying function.

BRIEF SUMMARY OF INVENTION

Accordingly, the invention provides a display with dual displaying function. The display can be disposed in a window of a building, wherein a display mode can be switched according to outdoor or indoor ambient light to optimize display quality. In addition, the display can be switched to a full display mode with light fully passing through therethrough. Compared to conventional self-luminescence outdoor displays, the display with dual displaying function of the invention can be applied to save energy. Additionally, if used as an advertisement billboard, the display with dual displaying function of the invention can offer convenient switching of advertisements.

An embodiment of the invention provides a dual display, comprising a first electrowetting display device and a second electrowetting display device, and a reflection transmission switching device therebetween, wherein the first electrowetting display device and the second electrowetting display device have a function of displaying images and can be switched to a transmissive mode.

Another embodiment of the invention provides a dual display, comprising a first substrate, a second substrate opposite the first substrate, a first patterned electrode and a second patterned electrode disposed on the first substrate, a reflective layer disposed on the first patterned electrode, a first patterned hydrophobic layer over the first patterned electrode, a second patterned hydrophobic layer over the second patterned electrode, a wall defining a pixel of the dual display, a first non-polar liquid disposed on the first patterned hydrophobic layer, and a second non-polar liquid disposed on the second patterned hydrophobic layer.

A further embodiment of the invention provides a dual display, comprising a first display device and a second display device, and a reflection transmission switching device therebetween, wherein when the first and second display device and the reflection transmission switching device are switched to a transmissive mode, the dual display is transparent, when the reflection transmission switching device is switched to a reflective mode, the first and second display devices can display different images, and when the reflection transmission switching device is switched to a transflective mode, the first and second display devices can present transmissive displays and reflective displays respectively.

Another further embodiment of the invention provides a dual display, comprising a first substrate and a second substrate comprising a plurality of pixels, wherein each pixel comprises a plurality of subpixels. The first substrate comprises a reflective region and a transmissive region for each subpixel, and a first color fluid is movable by an electric field on the reflective region and the transmissive region of a first subpixel. When the first color fluid covers the transmissive region, the dual display provides a first viewing side at the first substrate side under a transmissive mode, and when the first color fluid covers the reflective region or covers the reflective region and the transmissive region, the dual display provides a second viewing side at the second substrate side under a reflective mode.

Another further embodiment of the invention provides a dual display, comprising a first substrate and a second substrate comprising a plurality of pixels, wherein each pixel comprises a plurality of subpixels. The first substrate comprises a reflective region and a transmissive region for each subpixel, a color filter layer disposed on the reflective region and the transmissive region, and an opaque fluid movable with an electric field on the reflective region and the transmissive region of a first subpixel, wherein when the opaque fluid covers the reflective region, the dual display provides a first viewing side at the first substrate side under a transmissive mode, and when the opaque fluid covers the transmissive region, the dual display provides a second viewing side at the second substrate side under a reflective mode.

BRIEF DESCRIPTION OF DRAWINGS

The invention can be more fully understood by reading the subsequent detailed description and examples with references made to the accompanying drawings, wherein:

FIG. 10A and FIG. 10B illustrate a first operating mechanism of a dual display of an embodiment of the invention under a reflective mode.

FIG. 15A and FIG. 15B illustrate a second operating mechanism of a dual display of an embodiment of the invention under a transmissive mode.

FIG. 16A and FIG. 16B illustrate a third operating mechanism of a dual display of an embodiment of the invention under a transmissive mode.

FIG. 17A and FIG. 17B illustrate a fourth operating mechanism of a dual display of an embodiment of the invention under a transmissive mode.

FIG. 21A~FIG. 21C show another application of a dual display of the embodiment, wherein the dual display can be used on a window of a building or on a display window of a store.

DETAILED DESCRIPTION OF INVENTION

Figure 1:
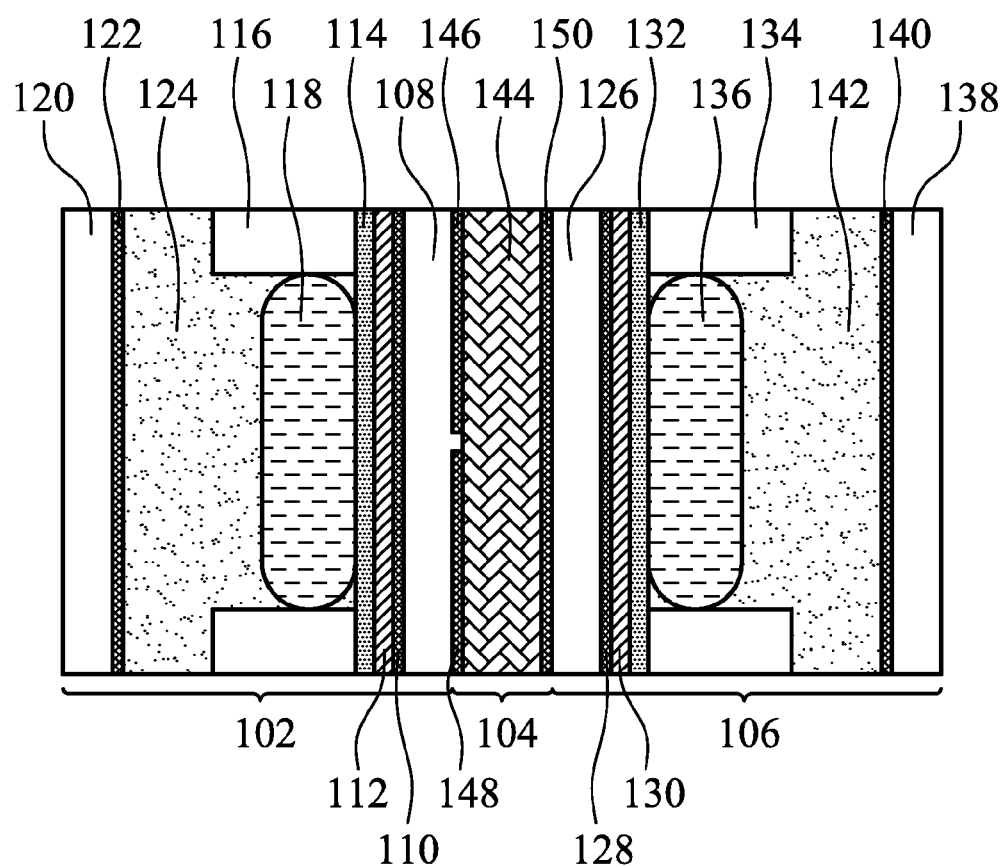
FIG. 1 shows a dual displaying structure of a first embodiment of the invention.

FIG. 1 shows a dual display of an embodiment of the invention. Referring to FIG. 1, the dual display of the embodiment mainly includes two electrowetting display devices 102, 106 and a polymer dispersed liquid crystal (PDLC) 104 therebetween. A first electrowetting display device 102 comprises a first patterned electrode 110 formed on a bottom substrate 108, a dielectric layer 112 formed on the patterned electrode 110 and a hydrophobic layer 114 on the dielectric layer 112. The electrode 110 can be a transparent electrode, for example formed of ITO, IZO or ZnO. The dielectric layer 112 can be silicon nitride, silicon oxide, aluminum oxide or titanium oxide or the combination of these materials. The hydrophobic layer 114 can be a macromolecule including fluorine, a diamond-like carbon thin film or a self assembled monolayer. A top substrate 120 is opposite to the bottom substrate 108. A common electrode 122 is formed on the top substrate 120. A hydrophilic wall 116, a polar liquid 124 and a non-polar liquid 118 are disposed between the top substrate 120 and the bottom substrate 108. The hydrophilic wall 116 can be a resist such as epoxy resin or acrylic resin, the polar liquid 124 can be water, alcohol or electrolyte-containing liquid, and the non-polar liquid 118 can comprise silicon oil, $C_{10}$-$C_{16}$ alkane (such as decane, dodecane, tetradecane or hexadecane), dye, pigment or lumophore. The second electrowetting display device 106 has substantially the same elements as the first electrowetting display device 102, but the second electrowetting display device 106 is minor-symmetrical to the first electrowetting display device 102. As shown in FIG. 1, the second electrowetting display device 106 comprises a patterned electrode 128 formed on a bottom substrate 126, a dielectric layer 130 on the patterned electrode 128, a hydrophobic layer 132 on the dielectric layer 130, a top substrate 138 opposite the bottom substrate 126, a common electrode 140 on the top substrate 138, and a hydrophilic wall 134, a polar liquid 142 and a non-polar liquid 136 between the top substrate 138 and the bottom substrate 126.

A polymer dispersed liquid crystal device 104 is disposed between the first electrowetting display device 102 and the second electrowetting display device 106, wherein the polymer dispersed liquid crystal device 104 comprises first and second patterned electrodes 146, 148 on the bottom substrate 108 of the first electrowetting display device 102, a common electrode 150 on the bottom substrate 126 of the second electrowetting display device 106 and a polymer dispersed liquid crystal liquid crystal layer 144 among the first pattern electrode 146, the second patterned electrode 148 and the common electrode 150.

Figure 7A:
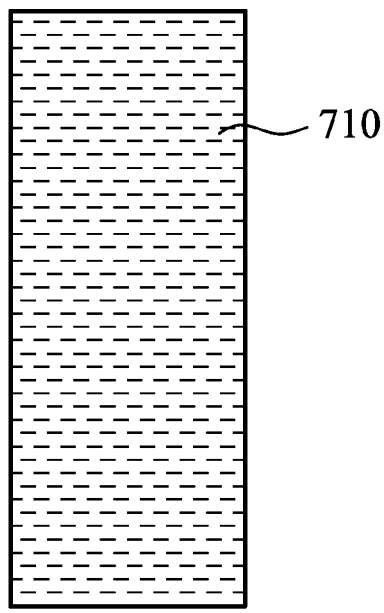
FIG. 7A~FIG. 8B illustrate control of oil drip of the electrowetting display device of an embodiment of the invention.
Figure 7B:
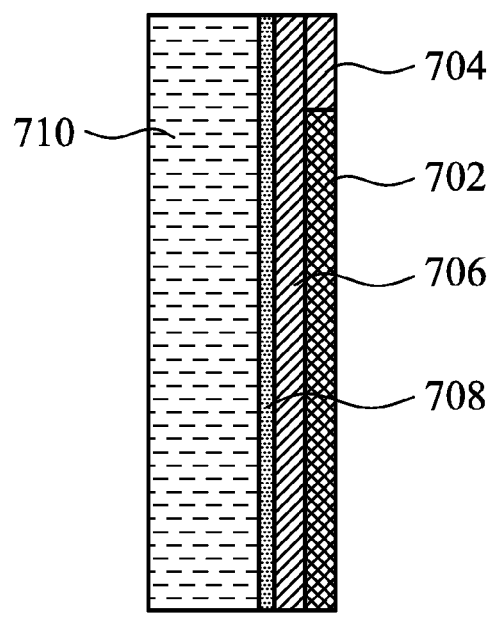
Figure 8A:
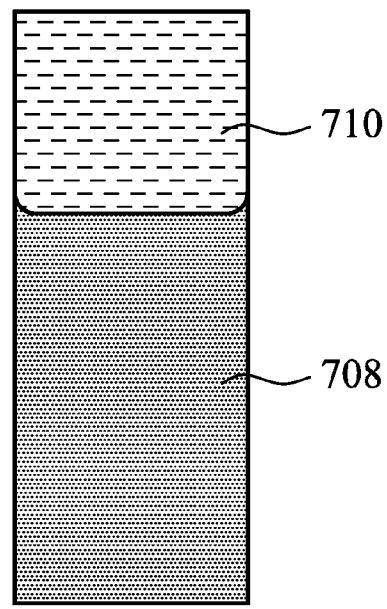
Figure 8B:
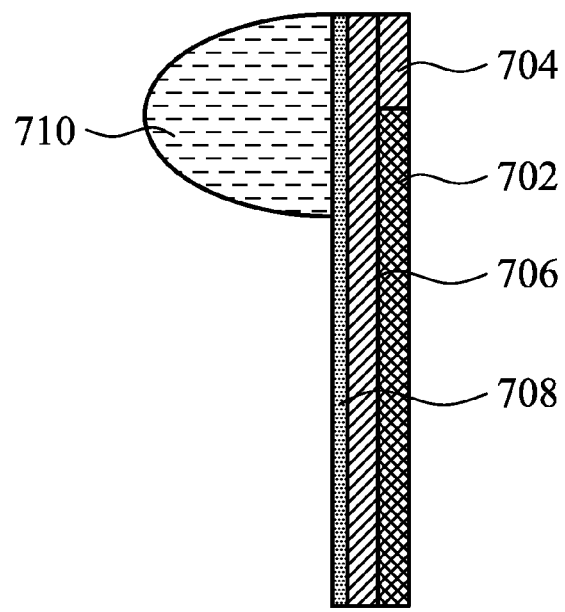

Control of an oil drip of the electrowetting display device of an embodiment of the invention is illustrated in accordance FIG. 7A~FIG. 8B, wherein the non-polar liquid is a printing ink, as an example. First referring to FIG. 7A and FIG. 7B, wherein FIG. 7A shows a top view of a single pixel of an electrowetting display device and FIG. 7B shows a side view of a single pixel of the electrowetting display device, an interval region 704 is disposed between electrodes 702 (only one electrode is shown), and a dielectric layer 706 and a hydrophobic layer 708 are formed on the electrodes 702. The interval region 704 can be filled with dielectric materials as the dielectric layer 706 or other non-conductive materials, such as resist. A printing ink 710 is disposed on the hydrophobic layer 708. As shown in the figure, when the electrode 702 is not applied with voltage, the printing ink 710 remains evenly distributed in the pixel. Referring to FIG. 8A and FIG. 8B, when the electrode 702 is applied with voltage, electrowetting phenomenon is not induced because electric field is not formed in the interval region 704, and the printing ink 710 is pushed toward the interval region 704 to control shrinkage orientation of the printing ink 710.

Figure 2A:
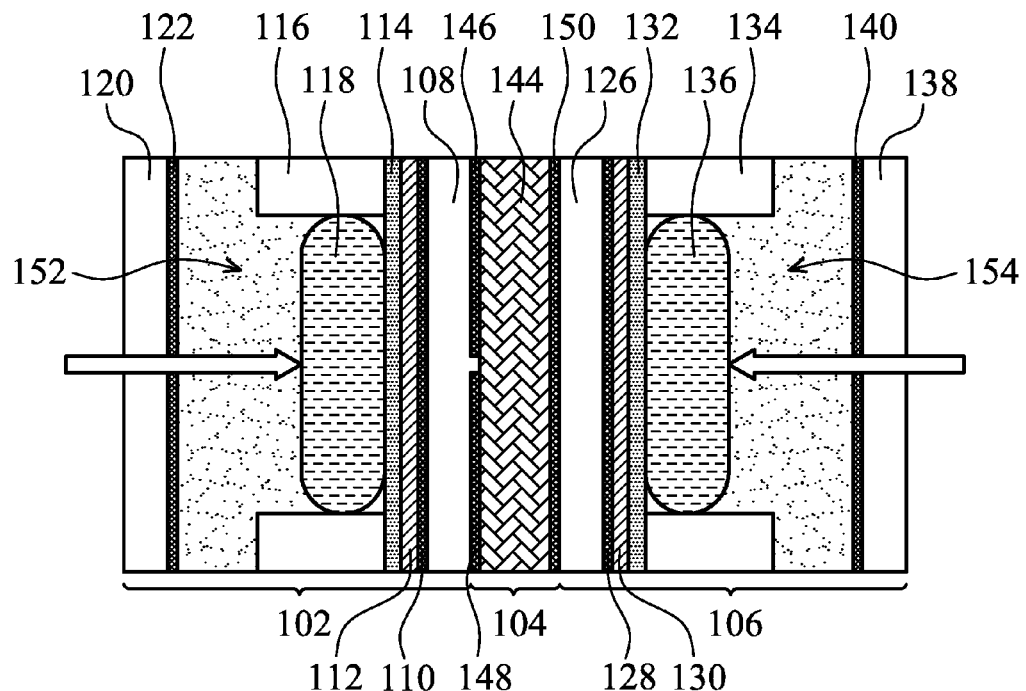
FIG. 2A~FIG. 2G illustrates operation of a dual display of the first embodiment of the invention.
Figure 2B:
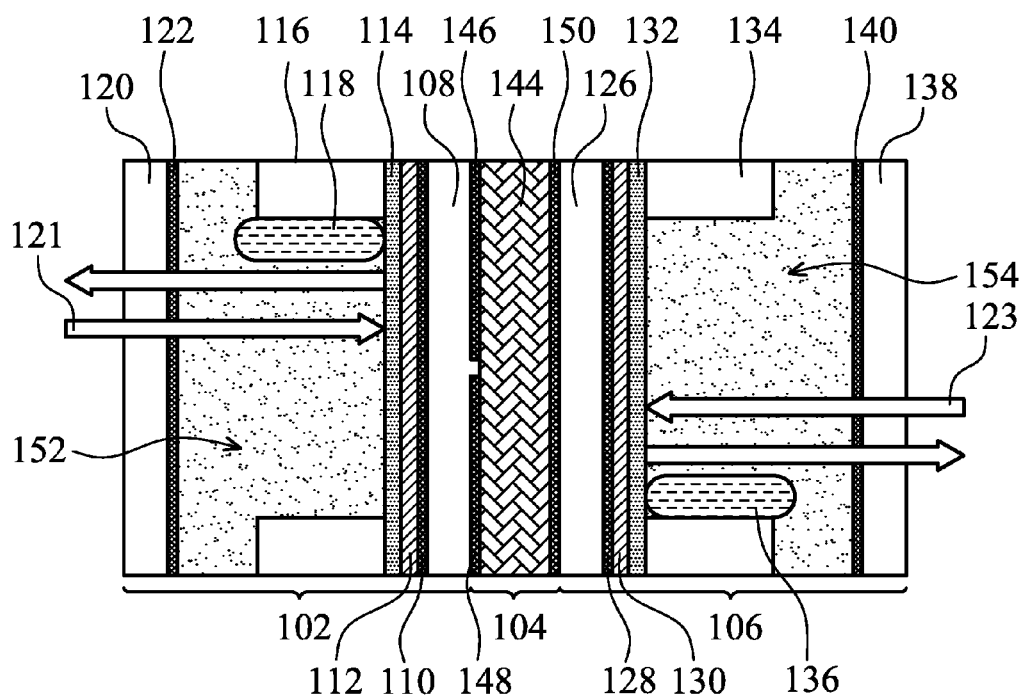

Operation of the dual display of the embodiment is illustrated in accordance with FIG. 2A~FIG. 2G, wherein the first electrowetting display device faces a first viewing side and the second electrowetting display device faces a second viewing side. First, referring to FIG. 2A, when the first patterned electrode 146, the second patterned electrode 148 and the common electrode 150 of the PDLC device 104 do not apply voltage to the polymer dispersed liquid crystal layer 144, the polymer dispersed liquid crystal layer 144 presents a white color, and the first and second electrowetting display devices 102, 106 act as reflective displays. FIG. 2A shows the state when the first displaying pixel 152 is turned off (not applied with voltage) and the second displaying pixel 154 is turned off (not applied with voltage). FIG. 2B shows the state when the first displaying pixel 152 is turned on (applied with voltage) and the second displaying pixel 154 is turned on (applied with voltage), wherein the first light 121 and the second light 123 are reflected light.

Figure 2C:
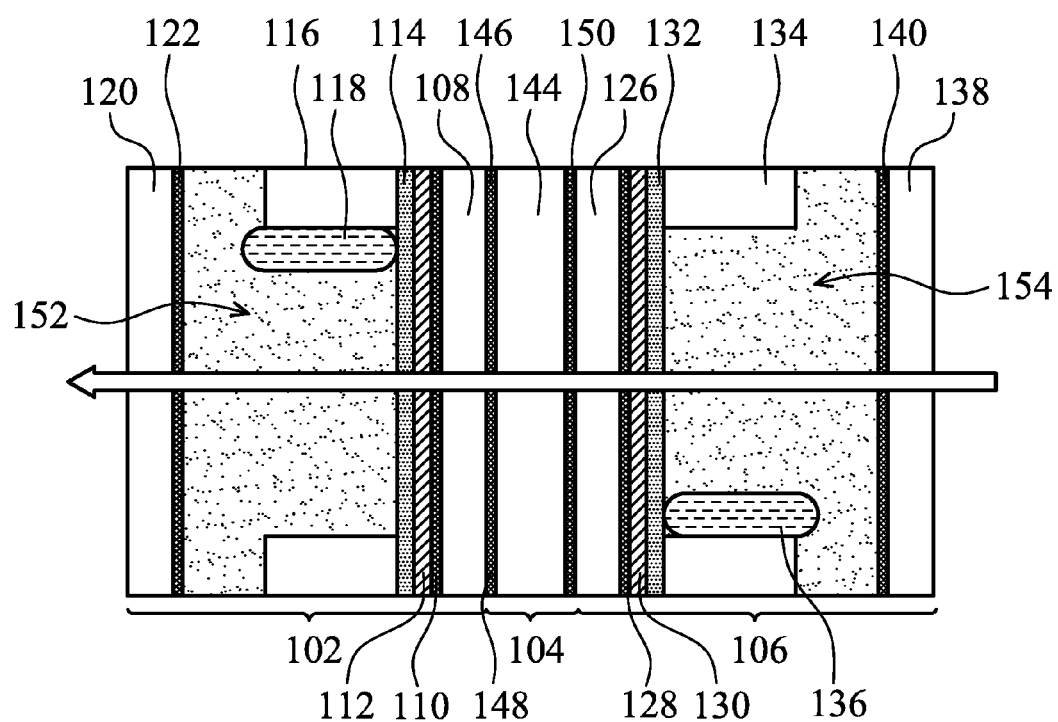

Referring to FIG. 2C, when the polymer dispersed liquid crystal layer 144 of the polymer dispersed liquid crystal device 104 is applied with voltage through the first patterned electrode 146, the second patterned electrode 148 and the common electrode 150, the polymer dispersed liquid crystal layer 144 presents a transparent state, and the first and second electrowetting display devices 102, 106 act as transmissive displays. As shown in FIG. 2C, when both the first displaying pixel 152 and the second displaying pixel 154 are turned on, the dual display of the embodiment is switched to a full transmissive mode.

Figure 2D:
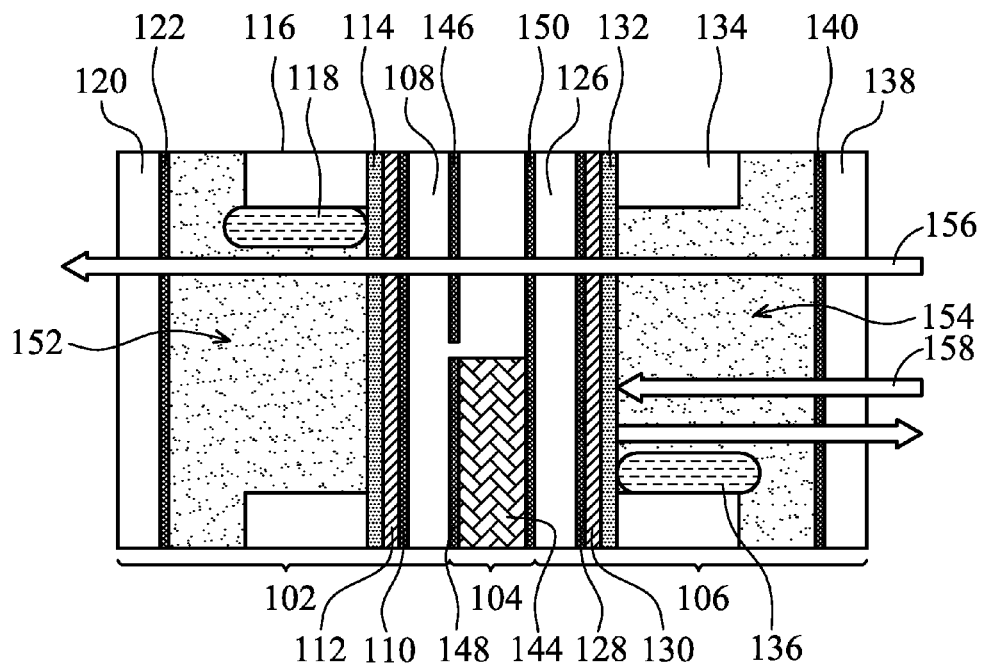
Figure 2E:
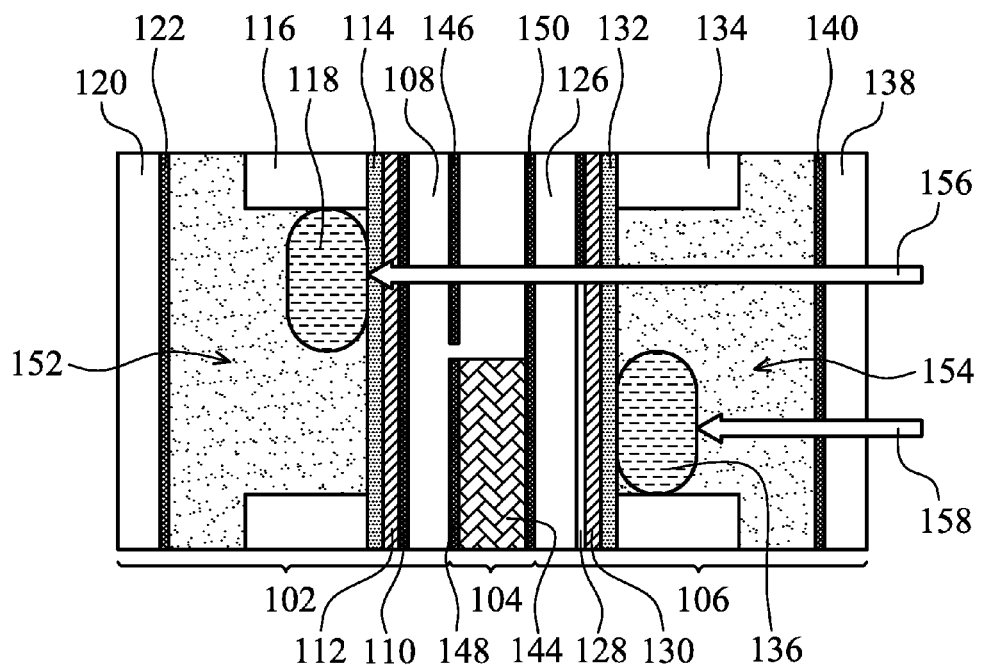

Referring to FIG. 2D and FIG. 2E, when the polymer dispersed liquid crystal layer 144 of the polymer dispersed liquid crystal device 104 is applied with voltage through the first patterned electrode 146 and the common electrode 150, a portion of the polymer dispersed liquid crystal layer 144 corresponding to the first patterned electrode 146 (the top half portion in the figure) is presented in a transparent state. The polymer dispersed liquid crystal layer 144 is not applied with voltage through the second patterned electrode 148 at this moment, such that a portion of the polymer dispersed liquid crystal layer 144 corresponding to the second patterned electrode 148 (the bottom half portion in the figure) presents a white color. The non-polar liquid 118 of the first electrowetting display device 102 is controlled by the first patterned electrode 110 to operate at a top half portion of the pixel 152. The first electrowetting display device 102 presents a transmissive display at this moment, in which light source is ambient light 156. The bottom portion of the polymer dispersed liquid crystal device 104 is presented in a reflective mode since the portion of the polymer dispersed liquid crystal layer 144 is not applied with voltage through the second patterned electrode 148. The non-polar liquid 136 of the second electrowetting display device 106 is controlled by the patterned electrode 128 to operate at a bottom half portion of the pixel 154 and the second electrowetting display device 106 presents a reflective display at this moment, in which the light source is ambient light 158. As shown in FIG. 2D, when both the first display pixel 152 and the second pixel 154 are turned on, an ambient light 156 passes through the top half portion of the polymer dispersed liquid crystal device 104 to serve as a light source of the first electrowetting display device 102. In addition, an ambient light 158 is reflected by the bottom half portion of the polymer dispersed liquid crystal device 104 to serve as light source of the second electrowetting display device 106. FIG. 2E show the state when the first electrowetting display device 152 and the second electrowetting display device 154 are turned off.

Figure 2F:
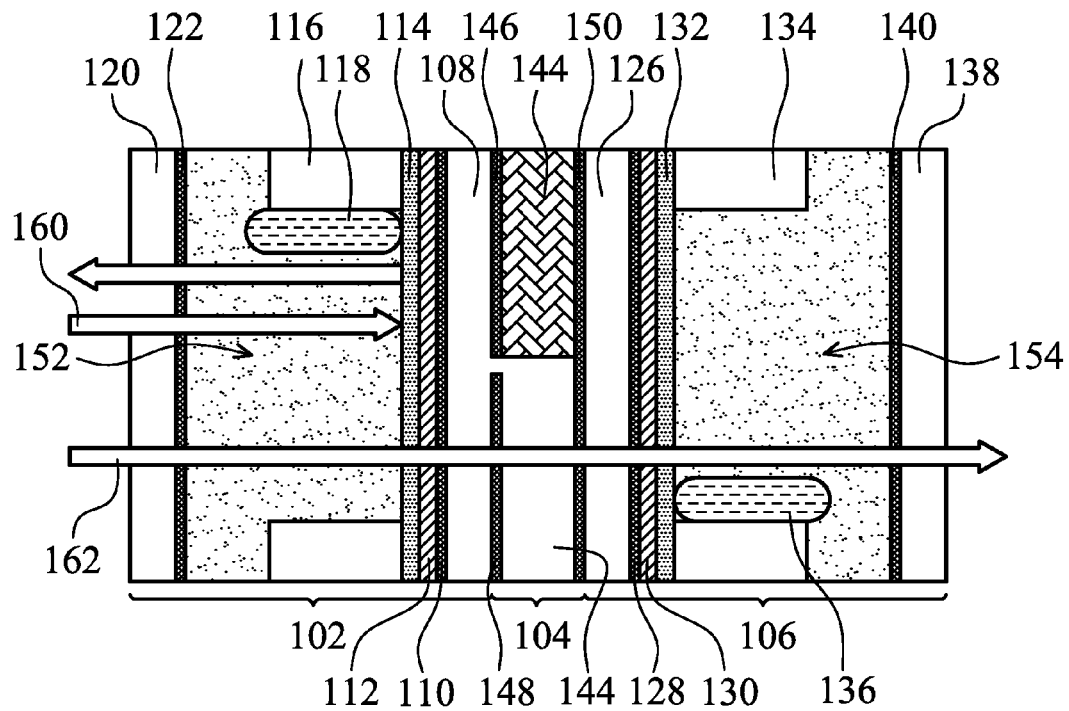
Figure 2G:
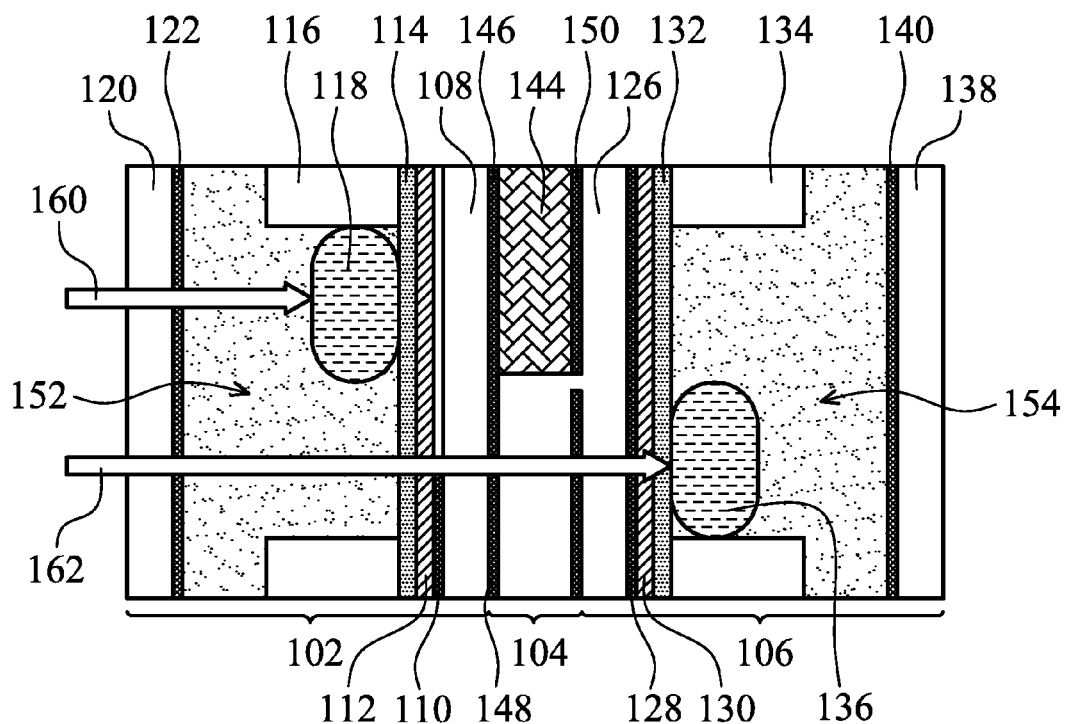

Referring to FIG. 2F and FIG. 2G, when the polymer dispersed liquid crystal layer 144 of the polymer dispersed liquid crystal device 104 is applied with voltage through the second patterned electrode 148 and the common electrode 150, a portion of the polymer dispersed liquid crystal layer 144 corresponding to the second patterned electrode 148 (the bottom half portion in the figure) is presented in a transparent state. The polymer dispersed liquid crystal layer 144 is not applied with voltage through the first patterned electrode 146 at this moment, such that a portion of the polymer dispersed liquid crystal layer 144 corresponding to the first patterned electrode 146 (the top half portion in the figure) presents a white color. The non-polar liquid 118 of the first electrowetting display device 102 is controlled by the patterned electrode 110 to operate at a top half portion of the pixel 152 and the first electrowetting display device 102 presents a reflective display at this moment, in which light source is ambient light 160. The bottom portion of the polymer dispersed liquid crystal device 104 presents a transparent mode since the portion of the polymer dispersed liquid crystal layer 144 is applied with voltage through the second patterned electrode 148. The non-polar liquid 136 of the second electrowetting display device 106 is controlled by the patterned electrode 128 to operate at a bottom half portion of the pixel 154 and the second electrowetting display device 106 presents a transmissive display at this moment, in which light source is the ambient light 162 passing through the first electrowetting display device 102. As shown in FIG. 2F, when both the first display pixel 152 and the second pixel 154 are turned on, an ambient light 162 passes through the bottom half portion of the polymer dispersed liquid crystal device 104 to serve as a light source of the second electrowetting display device 106. In addition, an ambient light 160 is reflected by the top half portion of the polymer dispersed liquid crystal device 104 to serve as light source of the first electrowetting display device 102. FIG. 2G shows the state when the first electrowetting display pixel 152 and the second electrowetting display pixel 154 are turned off.

Figure 3:
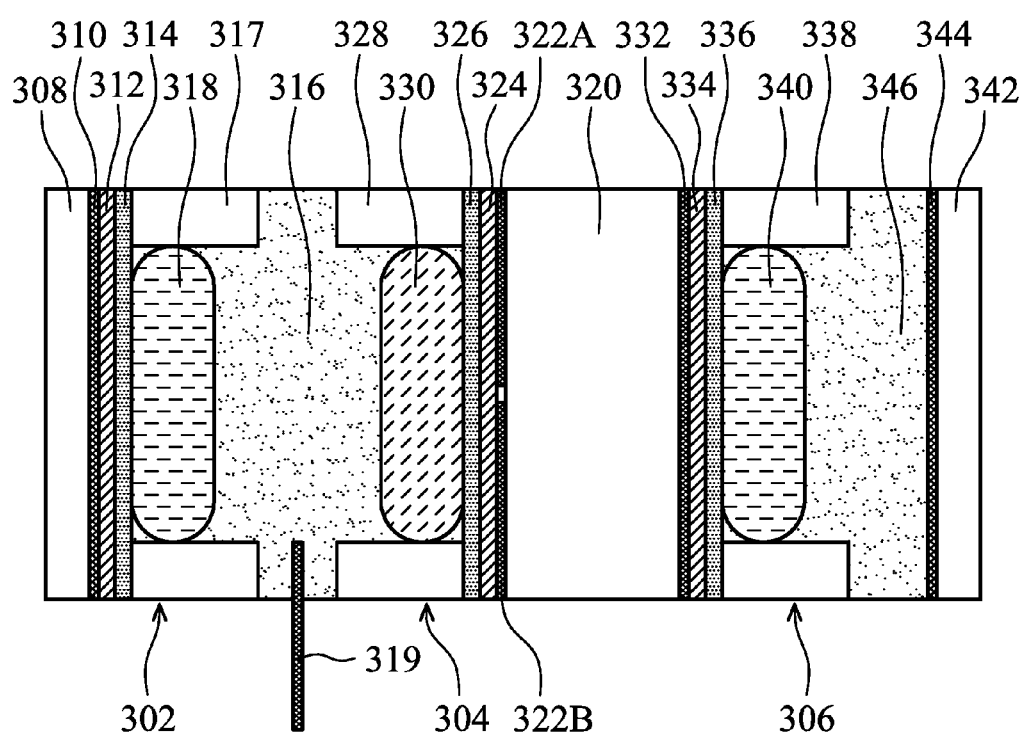
FIG. 3 shows a dual displaying structure of a second embodiment of the invention.

FIG. 3 shows a dual display of the second embodiment of the invention. Unlike the embodiment shown in FIG. 1 using a polymer dispersed liquid crystal device as a transmissive reflective switching device, this embodiment uses an electrowetting display device including a white color non-polar reflective liquid as the transmissive reflective mode switching device.

As shown in FIG. 3, the dual display of the embodiment includes three electrowetting display devices, wherein the third electrowetting display device 304 between the first electrowetting display device 302 and the second electrowetting display device 306 serves as a transmissive reflective mode switching device. In the first electrowetting display device 302, a patterned electrode 310 is formed on a first substrate 308, a common substrate 320 opposite the first substrate 308, and a hydrophilic wall 317, a polar liquid 316, a non-polar liquid 318 and a common electrode 319 are disposed between the first substrate 308 and the common substrate 320. In the third electrowetting display device 304, a first patterned electrode 322A and a second patterned electrode 322B are formed on a common substrate 320, a dielectric layer 324 is formed on the first and second patterned electrode 322A, 322B, a hydrophobic layer 326 is formed on the dielectric layer 324, and a hydrophilic wall 328 and a non-polar liquid 330 having reflective characteristics is formed on the hydrophobic layer 326. The electrode 310, 322A, 322B can be ITO, IZO or ZnO. The dielectric layer 312, 324 can be silicon nitride, silicon oxide, aluminum nitride titanium, oxide or the combination of these materials. The hydrophobic layer 314, 326 can be a macromolecule including fluorine, diamond-like carbon thin film or self assembled monolayer. The hydrophilic wall 317, 328 can be a resist material, such as epoxy resin or acrylic resin. The non-polar liquid 318, 330 can comprise silicon oil, $C_{10}$-$C_{16}$ alkane (such as decane, dodecane, tetradecane or hexadecane), dye or pigment or lumophore, and the polar liquid 316 can be water, alcohol or electrolyte-containing water. It is noted that the first electrowetting display device 302 and the third electrowetting display device 304 together uses the common electrode 319 and the polar liquid 316.

Elements of the second electrowetting display device 306 are substantially the same as that of the first electrowetting display device 302. Referring to FIG. 3, in the second electrowetting display device 306, a patterned electrode 332 is formed on a the other side of the common substrate 320, and a dielectric layer 334 is formed on the electrode 332, a hydrophobic layer 336 is formed on the dielectric layer 334, a second substrate 342 is opposite to the common substrate 320, a common electrode 344 is formed on the 342, and a hydrophilic wall 338, a polar liquid 346 and a non-polar liquid 340 is disposed between the second substrate 342 and the common substrate 320.

Figure 4A:
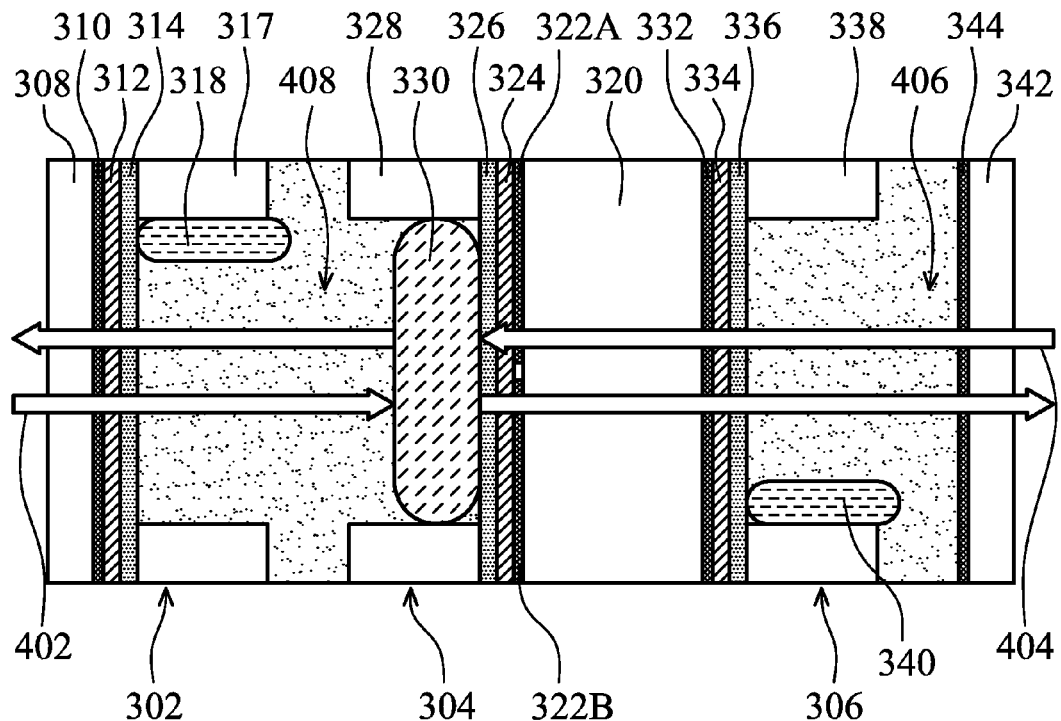
FIG. 4A~FIG. 4G illustrates operation of a dual display of the second embodiment of the invention.
Figure 4B:
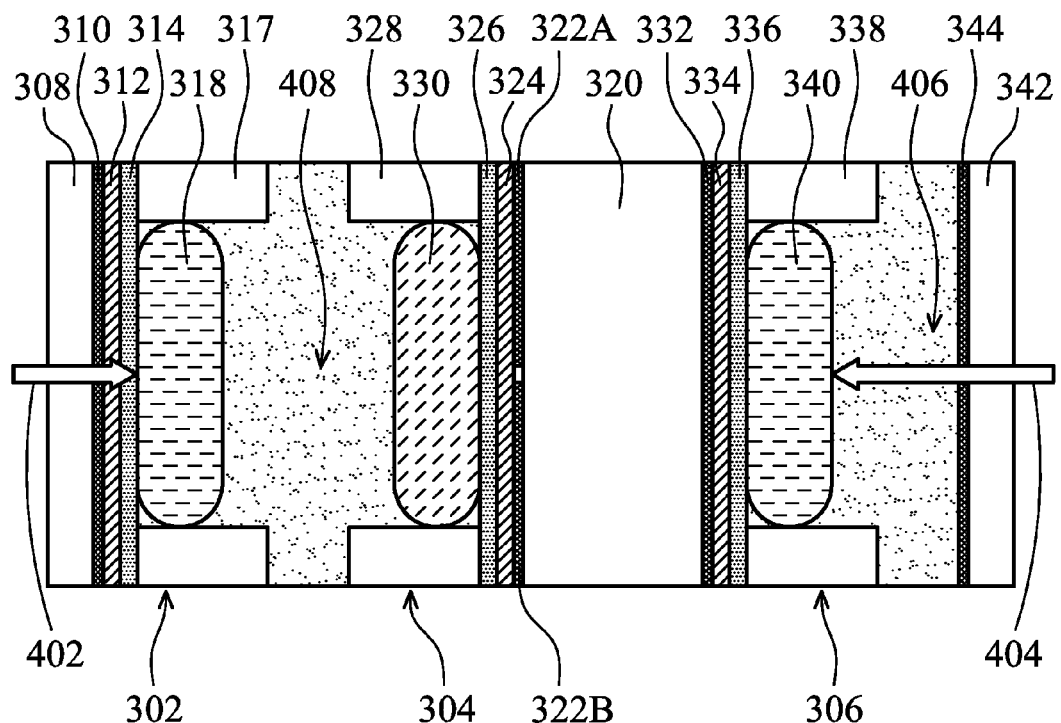

The operation of the dual display of the embodiment is illustrated in accordance with FIG. 4A~FIG. 4G, wherein the first electrowetting display device can face a first viewing side and second electrowetting display device can face a second viewing side. First, referring to FIG. 4A, when the third electrowetting display device 304 is not applied with voltage, the non-polar liquid 330 having reflective characteristics remains evenly distributed in a pixel to form a reflective plate reflecting ambient light 402 and 404. Both the first electrowetting display device 302 and the second electrowetting display device 306 are reflective displays at this moment. FIG. 4A shows the dual display when the first display pixel 408 is turned on (applied with voltage) and the second display pixel 406 is turned on (applied with voltage). FIG. 4B shows the dual display when the first display pixel 408 is turned off (not applied with voltage) and the second display pixel 406 is turned off (not applied with voltage).

Figure 4C:
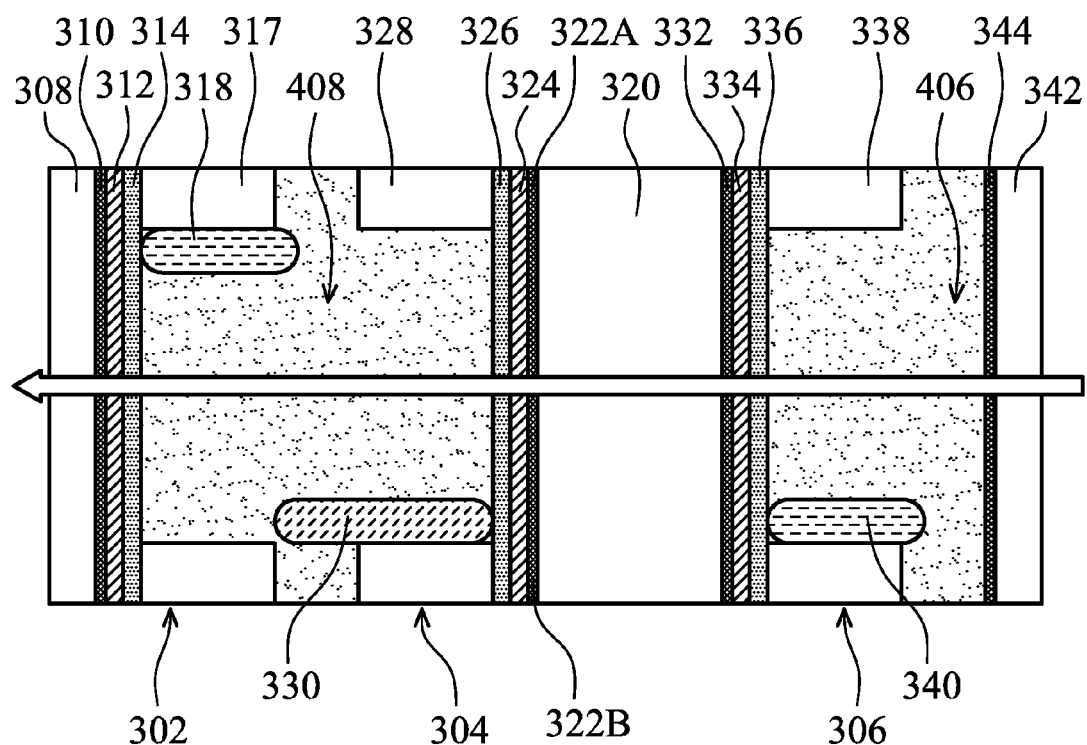

Referring to FIG. 4C, when both the first and second patterned electrode 322A, 322B in pixels of the third electrowetting display device 304 are applied with voltage, the non-polar liquid 330 having reflective characteristics shrinks. Therefore, the third electrowetting display device 304 presents a transmissive mode, and both the first electrowetting display device 302 and the second electrowetting display device 306 are transmissive displays at this moment. The non-polar liquid in one of first and second electrowetting display device 302, 306 of the dual display can be optionally controlled to shrink, and the non-polar liquid in another one of the first and second electrowetting display device 302, 306 of the dual display can be optionally controlled to display images for the dual display to perform transmissive displaying. Alternatively, both the first electrowetting display device 302 and the second electrowetting display device 306 can be driven so that the non-polar liquid shrinks, such that the dual display presents a full transmissive mode. As shown in FIG. 4C, when both the first display pixel 408 and the second display pixel 406 are turned on (applied with voltage), the dual display of the embodiment is switched to a full transmissive mode.

Figure 4D:
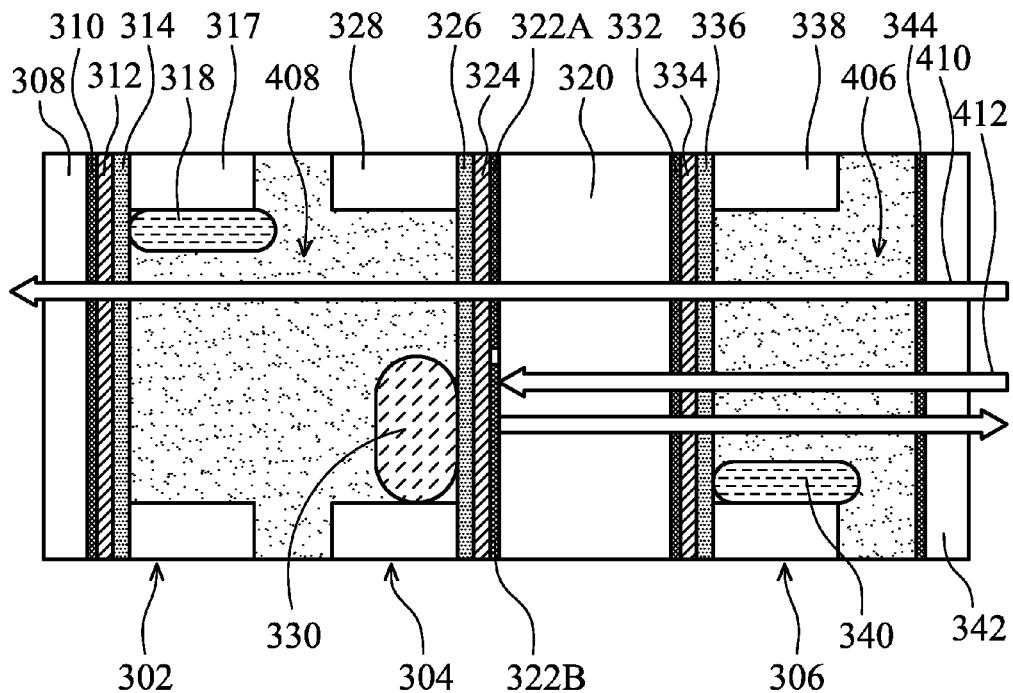
Figure 4E:
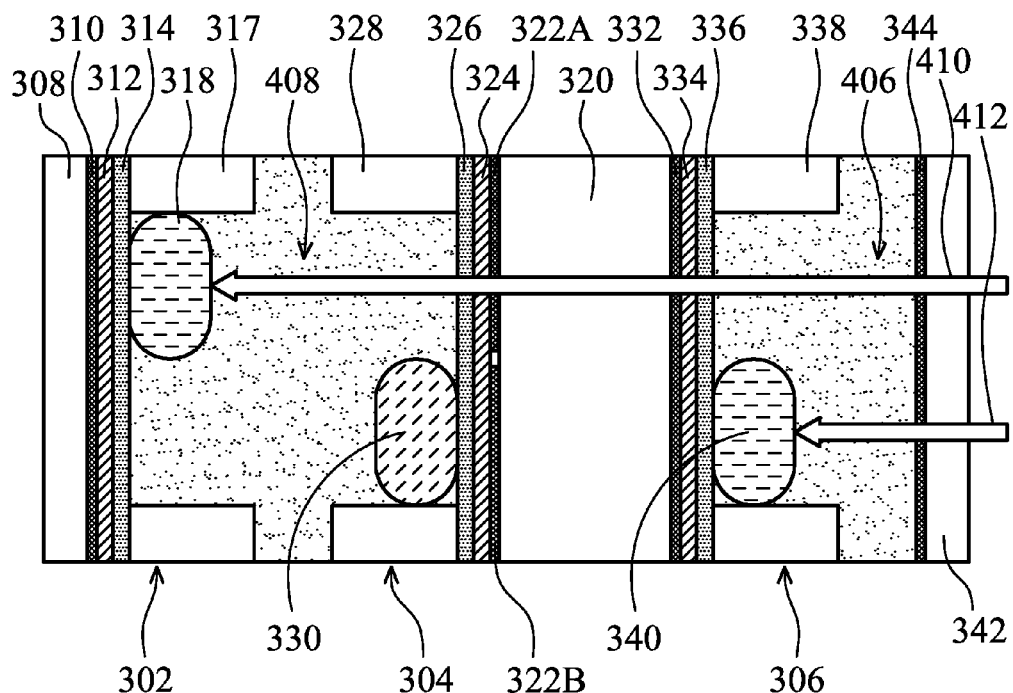

Referring to FIG. 4D and FIG. 4E, when the first patterned electrode 322A in the top half portion of a pixel of the third electrowetting display device 304 is applied with voltage, and the non-polar liquid 330 having reflective characteristics move downward in the pixel, the top half portion of the pixel is a transmissive region and the bottom half portion of the pixel is a reflective region. The non-polar liquid 318 of the first electrowetting display device 302 is controlled by the patterned electrode 310 to operate at the top half portion of the pixel. The first electrowetting display device 302 presents a transmissive display wherein it's light source can be ambient light 410 passing through the second electrowetting display device 306. The non-polar liquid 340 of the second electrowetting display device 306 is controlled by the patterned electrode 332 to operate at the bottom half portion of the pixel. The second electrowetting display device 306 presents a reflective display wherein its light source can be reflective ambient light 412. As shown in FIG. 4D, when the first display pixel 408 and the second display pixel 406 are turned on, an ambient light 410 passes through the top half portion of the third electrowetting display device 304 to serve as a light source of the first electrowetting display device 302. In addition, an ambient light 412 is reflected by the bottom half portion of the third electrowetting display device 304 to serve as a light source of the second electrowetting display device 306. FIG. 4E shows the state when the first display pixel 408 and the second display pixel 406 are turned off.

Figure 4F:
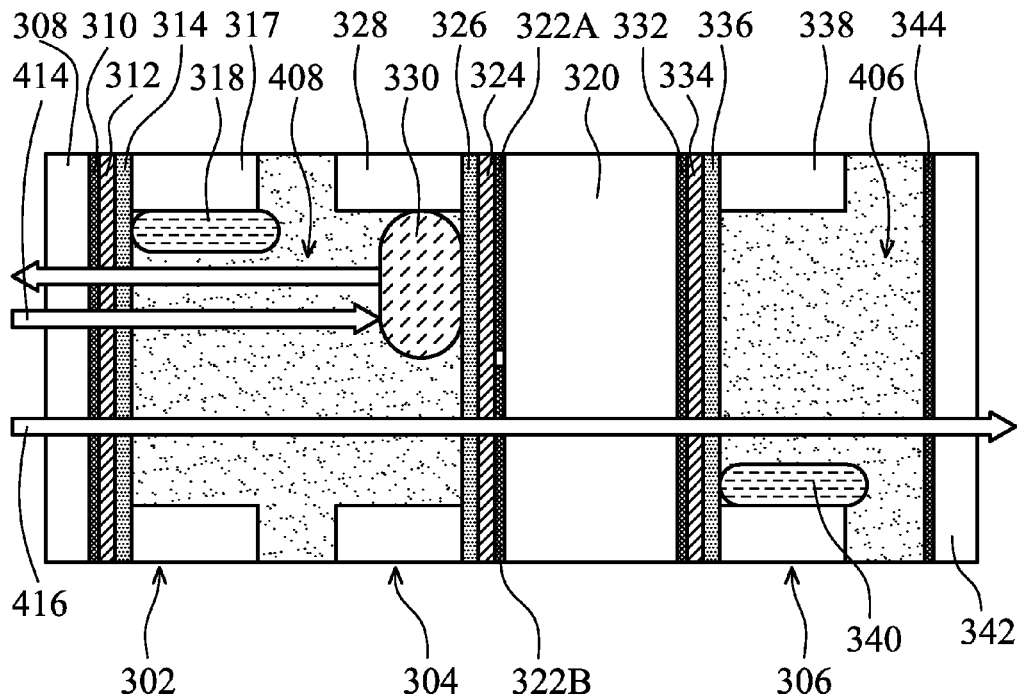
Figure 4G:
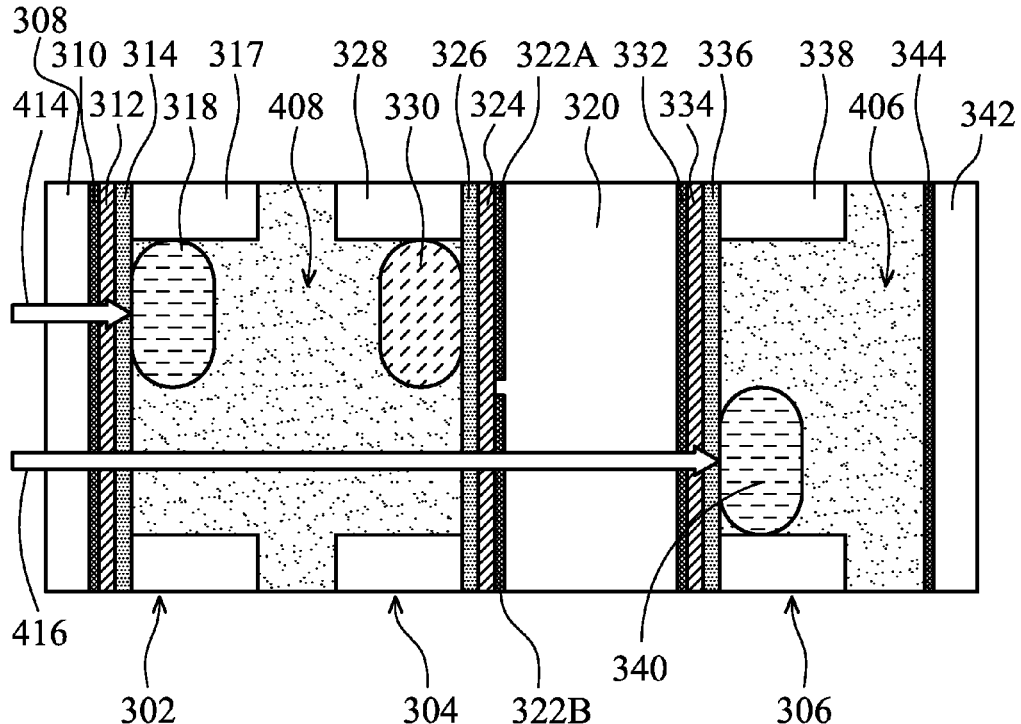

Referring to FIG. 4F and FIG. 4G, the second patterned electrode 322B at the bottom half portion of the pixel of the third electrowetting display device 304 is applied with voltage for the non-polar liquid 330 having reflective characteristics to move toward the top half portion of the pixel. The top half portion of the pixel is a reflective region and the bottom half portion of the pixel is a transmissive region. The non-polar liquid 318 of the first electrowetting display device 302 is controlled by the patterned electrode 310 to operate at the top half portion of the pixel, and the first electrowetting display device 302 presents a reflective display wherein it's light source can be ambient light 414. The non-polar liquid 340 of the second electrowetting display device 306 is controlled by the patterned electrode 332 to operate at the bottom half portion of the pixel, and the second electrowetting display device 306 presents a transmissive display wherein it's light source can be ambient light 416 passing through the first electrowetting display device 302. As shown in FIG. 4F, when the first display pixel 408 and the second display pixel 406 are turned on, an ambient light 416 passes through the bottom half portion of the third electrowetting display device 304 to serve as a light source of the second electrowetting display device 306. In addition, an ambient light 414 is reflected by the top half portion of the third electrowetting display device 304 to serve as a light source of the first electrowetting display device 302. FIG. 4G shows the state when the first display pixel 408 and the second display pixel 406 are turned off.

Figure 5:
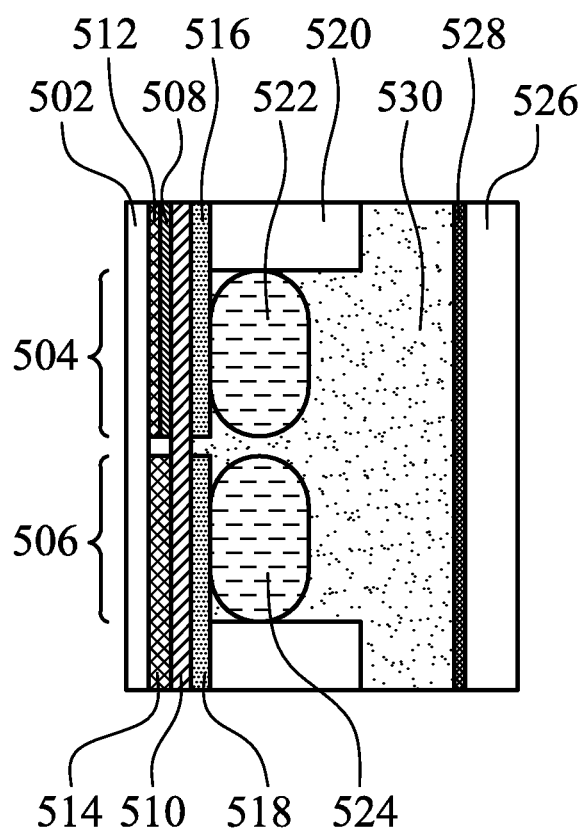
FIG. 5 shows a dual displaying structure of a third embodiment of the invention.

FIG. 5 shows a dual display of the third embodiment of the invention. Unlike the embodiments shown in FIG. 1 and FIG. 3 including reflection transmission switching devices, in FIG. 5, a reflective layer is disposed in a portion of a pixel region of the dual display for the single device to present a reflective mode, a transmissive mode or a transflective mode according to requirements or ambient light illumination direction. Referring to FIG. 5, in the dual display of the embodiment, a first patterned electrode 512 and a second patterned electrode 514 are disposed on a first substrate 502, wherein the first patterned electrode 512 is connected to a first TFT (not shown), and the second patterned electrode 514 is connected to a second TFT (not shown). A reflective layer 508 is disposed on the first patterned electrode 512. The dual display of the embodiment has a reflective region 504 corresponding to position where the reflective layer 508 is formed and has a transmissive region 506 corresponding to position where the reflective layer is not formed. A dielectric layer 510 is disposed on the reflective layer 508, the first patterned electrode 512 and the second patterned electrode 514. The first substrate 502 can be glass or plastic. The first patterned electrode 512 can be transparent electrodes such ITO, IZO or ZnO or conductive metal such as aluminum or silver and the second patterned electrode 514 can be transparent electrodes such ITO, IZO or ZnO. The reflective layer 508 can be metal such as aluminum or silver, or white material with high reflectivity such as titanium oxide. The dielectric layer 510 can be silicon nitride, silicon oxide, aluminum oxide, titanium oxide or the combination of these materials., etc. In an important feature of the embodiment, a first patterned hydrophobic layer 516 and a second patterned hydrophobic layer 518 are formed on the dielectric layer 510, and due to the separated first and second hydrophobic layers 516, 518, the first non-polar liquid 522 and the second non-polar liquid 524 can be operated independently on the separated first and second hydrophobic layers 516, 518. For example, in an embodiment of the invention, the first TFT (not shown) electrically connecting the first patterned electrode 512 and the second TFT (not shown) electrically connecting the second patterned electrode 514 can control the first non-polar liquid 522 and the second non-polar liquid 524 respectively. In addition, the first and second non-polar liquids 522, 524 disposed in different regions of a single pixel can have the same or different color, thickness or concentration of dye, pigment, or lumophore. A second substrate 526 is opposite to the first substrate 502. A common electrode 528 is disposed on the second substrate 526. A hydrophilic wall 520 is disposed on the first patterned hydrophobic layer 516 and the second patterned hydrophobic layer 518. A polar liquid 530 is filled into the region between the common electrode 528 and the hydrophilic wall 520. The second substrate 526 can be glass or plastic. The common electrode 528 can be transparent electrodes such ITO, IZO or ZnO. The non-polar liquids 522, 524 can comprise silicon oil, $C_{10}$-$C_{16}$ alkane (such as decane, dodecane, tetradecane or hexadecane), dye, pigment or lumophore. The polar liquid 530 can be water, alcohol or electrolyte-containing liquid. The hydrophilic wall 520 can be resist material, such as epoxy resin or acrylic resin. The first and second patterned hydrophobic layers 516, 518 can be a macromolecule including fluorine, diamond-like carbon thin film or self assembled monolayer.

Figure 6A:
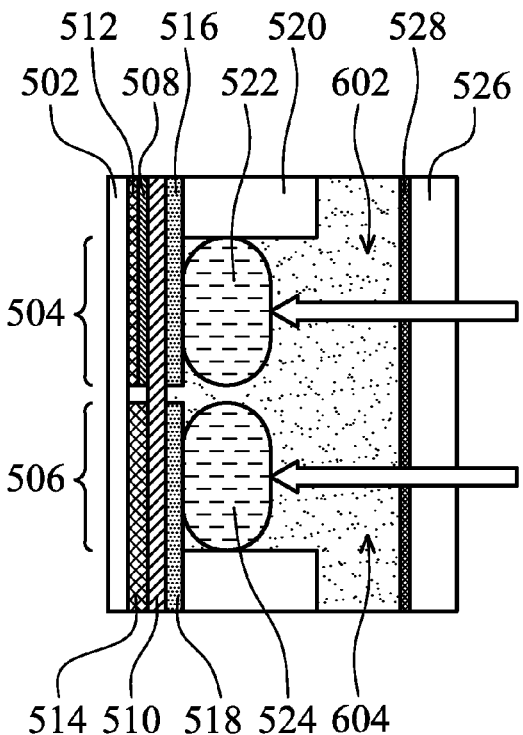
FIG. 6A~FIG. 6D illustrates operation of a dual display of the third embodiment of the invention.
Figure 6B:
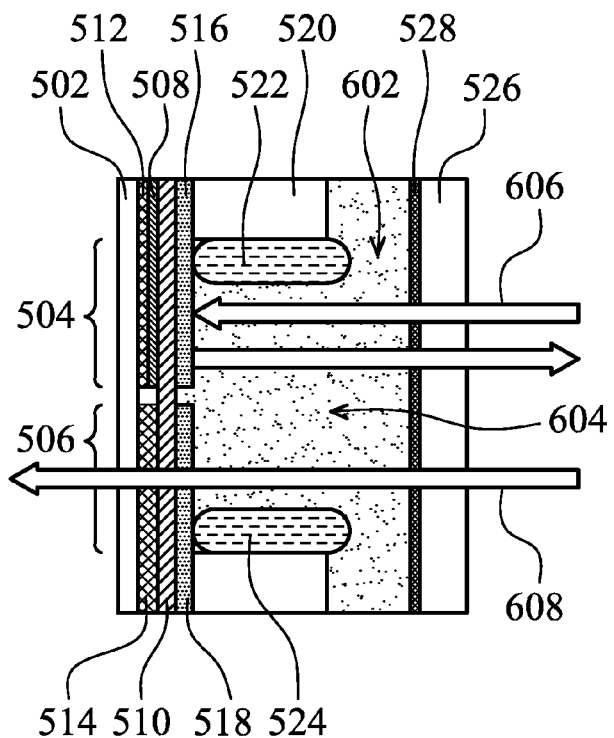

The operation of the dual display of the embodiment is illustrated in accordance with FIG. 6A~FIG. 6D. Referring to FIG. 6A and FIG. 6B, the non-polar liquids 522 and 524 are respectively disposed in the reflective region 504 and the transmissive region 506 on the separated first patterned hydrophobic layer 516 and the second patterned hydrophobic layer 518 and are driven with different TFTs (not shown). FIG. 6A shows the state when the first display pixel 602 and the second display pixel 604 are turned off (not applied with voltage), wherein the first non-polar liquid 522 and the second non-polar liquid 524 lie in the pixel. FIG. 6B shows the state when the first display pixel 602 and the second display pixel 604 are turned on (applied with voltage), wherein the first non-polar liquid 522 and the second non-polar liquid 524 shrink toward the hydrophilic wall 520. The reflective layer 508 in the reflective region 504 can reflect ambient light 606 for the first display pixel 602 of the dual display of the embodiment to be presented in a reflective mode. The viewing side is at the second substrate 526 side. An ambient light 608 passes through the transmissive region 506 to provide a light source required by the second display pixel 604 for the display to be presented in a transmissive mode. The viewing side is at the first substrate 502 side. The operation in FIG. 6B is suitable for the application of a dual display. In other words, the display can be viewed at two opposite sides, wherein one side shows an image presented by the first display pixel 602 in a reflective mode, and the other side shows an image presented by the second display pixel 604 in a transmissive mode. The ambient light 606 passes through the non-polar liquid 522 in the reflective region twice, but the ambient light 608 passes through the non-polar liquid 524 in the transmissive region only once. In order for the reflective mode and the transmissive mode to presents best image qualities, the non-polar liquid 522 in the reflective region can have thickness or concentration of dye, pigment or lumophore less than or equal to the non-polar liquid 524 in the transmissive region. In addition, in order to have broader display application, colors of the non-polar liquids 522 and 524 can be different. Specifically, one of the colors of the non-polar liquids 522 and 524 can be black, such that the dual display can present colorful images on one side, and present black and white pictures on the other side.

Figure 6C:
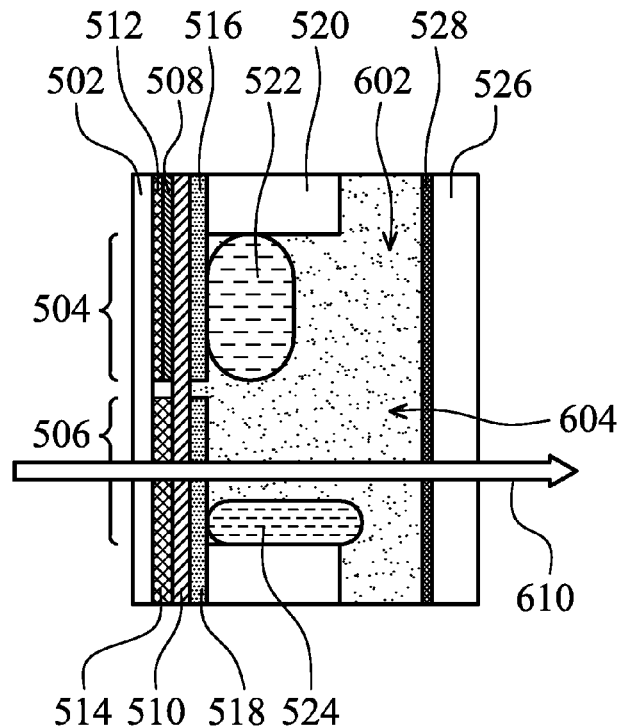

Referring to FIG. 6C, when the light source 610 is at the first substrate 502 side, the second display pixel 604 can display in a transmissive mode and the viewing side is at the second substrate 526 side. When the second display pixel 604 is applied with voltage, the second non-polar liquid 524 shrinks toward the hydrophilic wall 520 and the first display pixel 602 can be not applied with voltage for the first non-polar liquid 522 to remain in the reflective region.

Figure 6D:
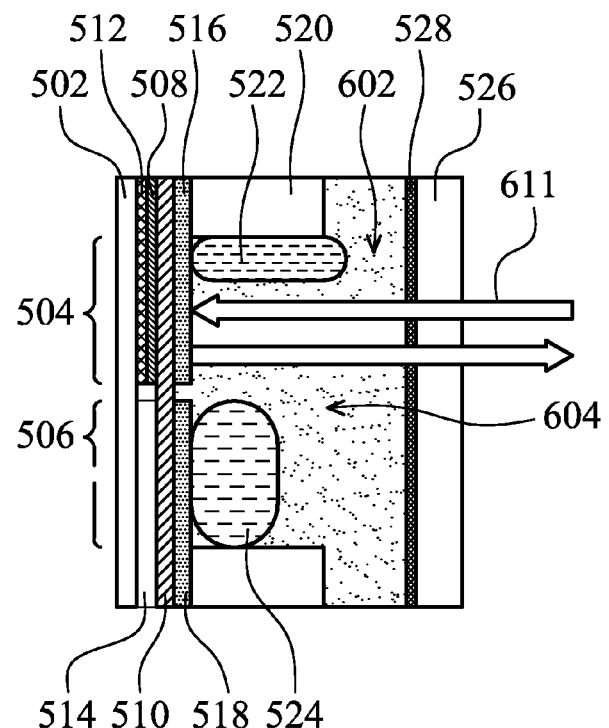

Referring to FIG. 6D, when two sides of the dual display have light source have substantially the same illumination, the first display pixel 602 can display in a reflective mode. The viewing side is at the second substrate 526 side and the light source is 611. The second display pixel 604 can be not applied with voltage for the second non-polar liquid 524 to remain in the transmissive region 506.

Figure 9A:
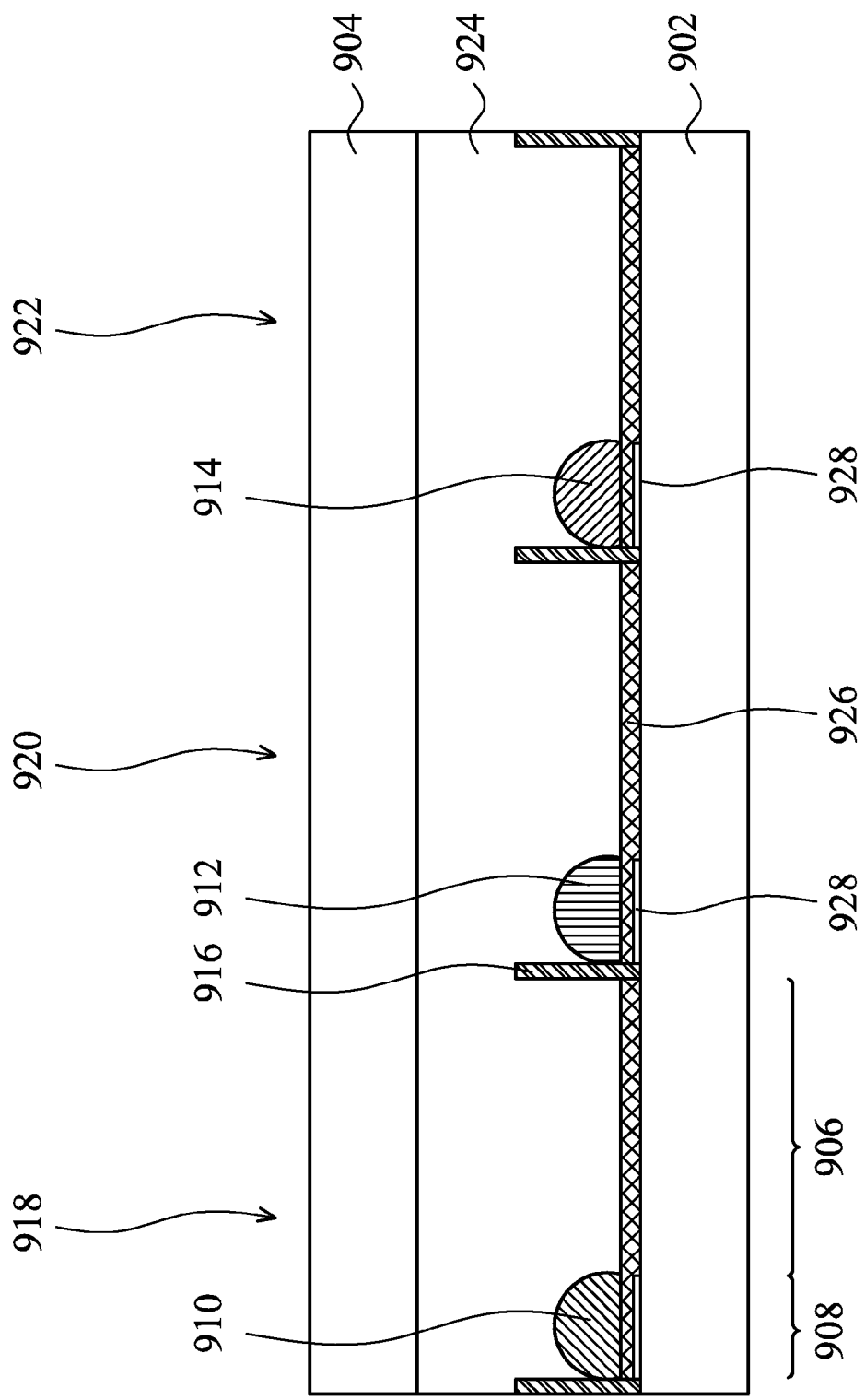
FIG. 9A shows a dual display of an embodiment of the invention.

FIG. 9A shows a dual display of an embodiment of the invention. Unlike the embodiment shown in FIG. 5, only one non-polar liquid/fluid is controlled in each subpixel in this embodiment. Referring to FIG. 9A, a first substrate 902 and a second substrate 904 opposite to the first substrate 902 are provided. The first substrate 902 and the second substrate 904 can be formed of transparent material, such as glass. Hydrophilic walls 916 are disposed on the first substrate 902 to separate the subpixels of the dual display. Each subpixel comprises a transmissive region 906 and a reflective region 908, wherein a transparent electrode 926 is formed on an inner surface of the first substrate 902 in the transmissive region 906 (or in both of the transmissive and reflective regions) and a reflective electrode 928 is formed on the inner surface of the first substrate 902 in the reflective region 908. In the embodiment, the transparent electrode 926 is preferably formed of transparent material, such as ITO, IZO or ZnO., and the reflective electrode 928 is preferably formed of high reflectivity metal material, such as aluminum. For improving image qualities, the reflective region 908 further comprising a black resin (not shown) under the reflective electrode 928. A polar liquid 924 is interposed between the first substrate 902 and the second substrate 904. In the embodiment, a pixel is separated into three subpixels, comprising a first subpixel 918, a second subpixel 920 and a third subpixel 922. The first, second and third color fluids 910, 912, 914 can be selected from the group consisting of RGB, CMY, RGBK and CMYK. For example, the first subpixel 918 can be red, the second subpixel 920 can be green, and the third subpixel 922 can be blue. A first color fluid 910 which is movable by an electrical field is controlled in the first subpixel 918. The first color fluid 910 can expand over the transparent electrode 926 and the reflective electrode 928, or shrink on the reflective region 908. A second color fluid 912 is controlled in the second subpixel 920, and a third color fluid 914 is controlled in the third subpixel 922.

Figure 9B:
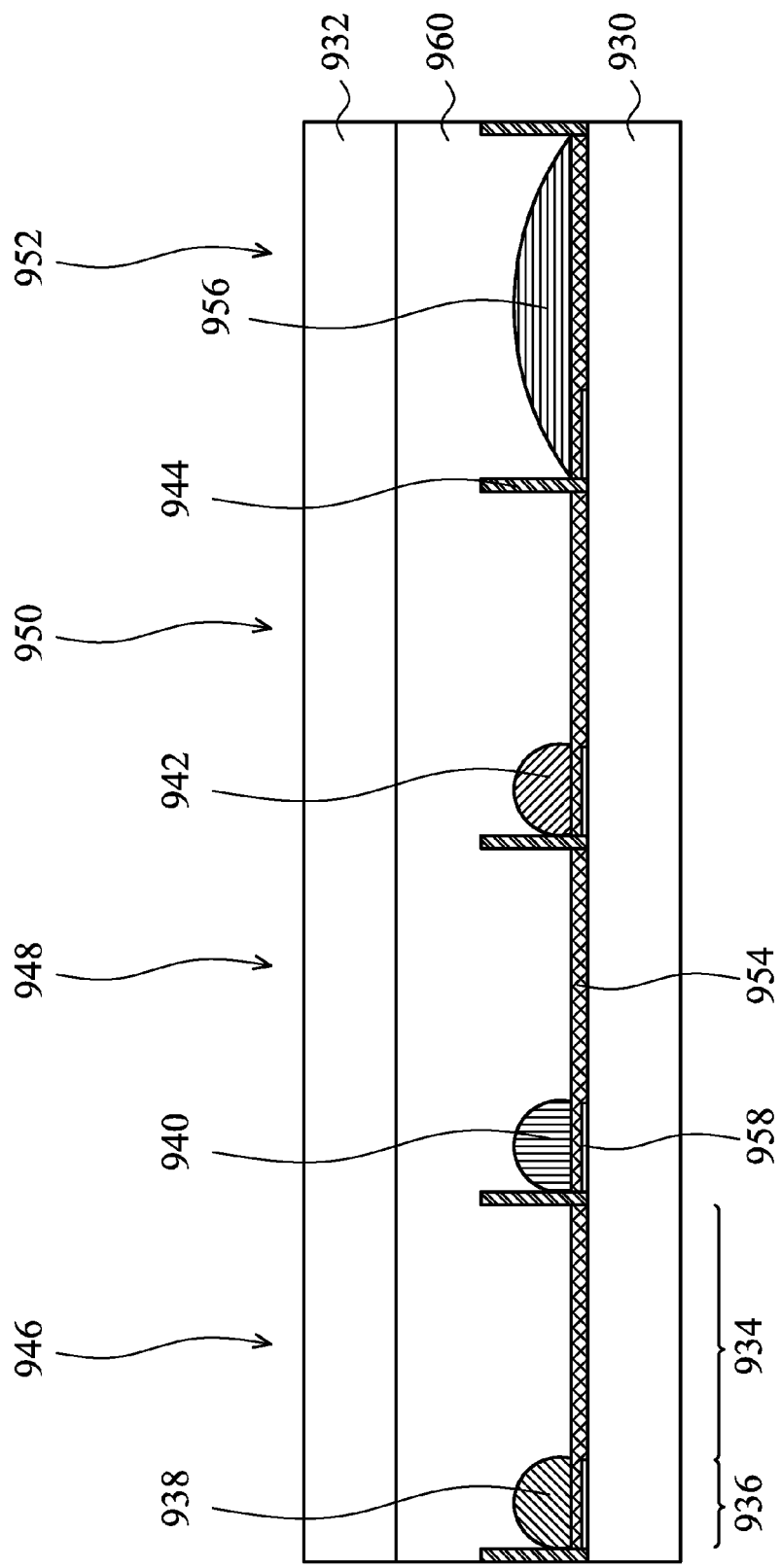
FIG. 9B shows a dual display of another embodiment of the invention.

FIG. 9B shows a dual display of another embodiment of the invention. Unlike the embodiments shown in FIG. 9A having only three subpixels, one pixel has four subpixels in the embodiment shown in FIG. 9B. Referring to FIG. 9B, a first substrate 930 and a second substrate 932 opposite to the first substrate 930 are provided. The first substrate 930 and the second substrate 932 can be formed of transparent material, such as glass. Hydrophilic walls 944 are disposed on the first substrate 930 to separate the subpixels of the dual display. Each subpixel comprises a transmissive region 934 and a reflective region 936, wherein the transparent electrode 954 is formed on an inner surface of the first substrate 930 in the transmissive region 934 (or in both of the transmissive and reflective regions) and a reflective electrode 958 is formed on the inner surface of the first substrate 930 in the reflective region 936. In the embodiment, the transparent electrode 954 is preferably formed of transparent material, such as ITO, IZO or ZnO, and the reflective electrode 958 is preferably formed of high reflectivity metal material, such as aluminum. For improving image qualities, the reflective region 936 further comprising a black resin (not shown) under the reflective electrode 958. A polar liquid 960 is interposed between the first substrate 930 and the second substrate 932. In the embodiment, a pixel is separated into four subpixels, comprising a first subpixel 946, a second subpixel 948, a third subpixel 950 and a fourth subpixel 952. For example, the first subpixel 946 can be red, the second subpixel 948 can be green, the third subpixel 950 can be blue and the fourth subpixel 952 can be black. A first color fluid 938 which is movable by an electrical field is controlled in the first subpixel 946, which can expand over the transparent electrode 954 and the reflective electrode 958 or shrink on the reflective electrode 958. A second color fluid 940 is controlled in the second subpixel 948, a third color fluid 942 is controlled in the third subpixel 950, and a fourth color fluid 956 is controlled in the fourth subpixel 952.

Figure 9C:
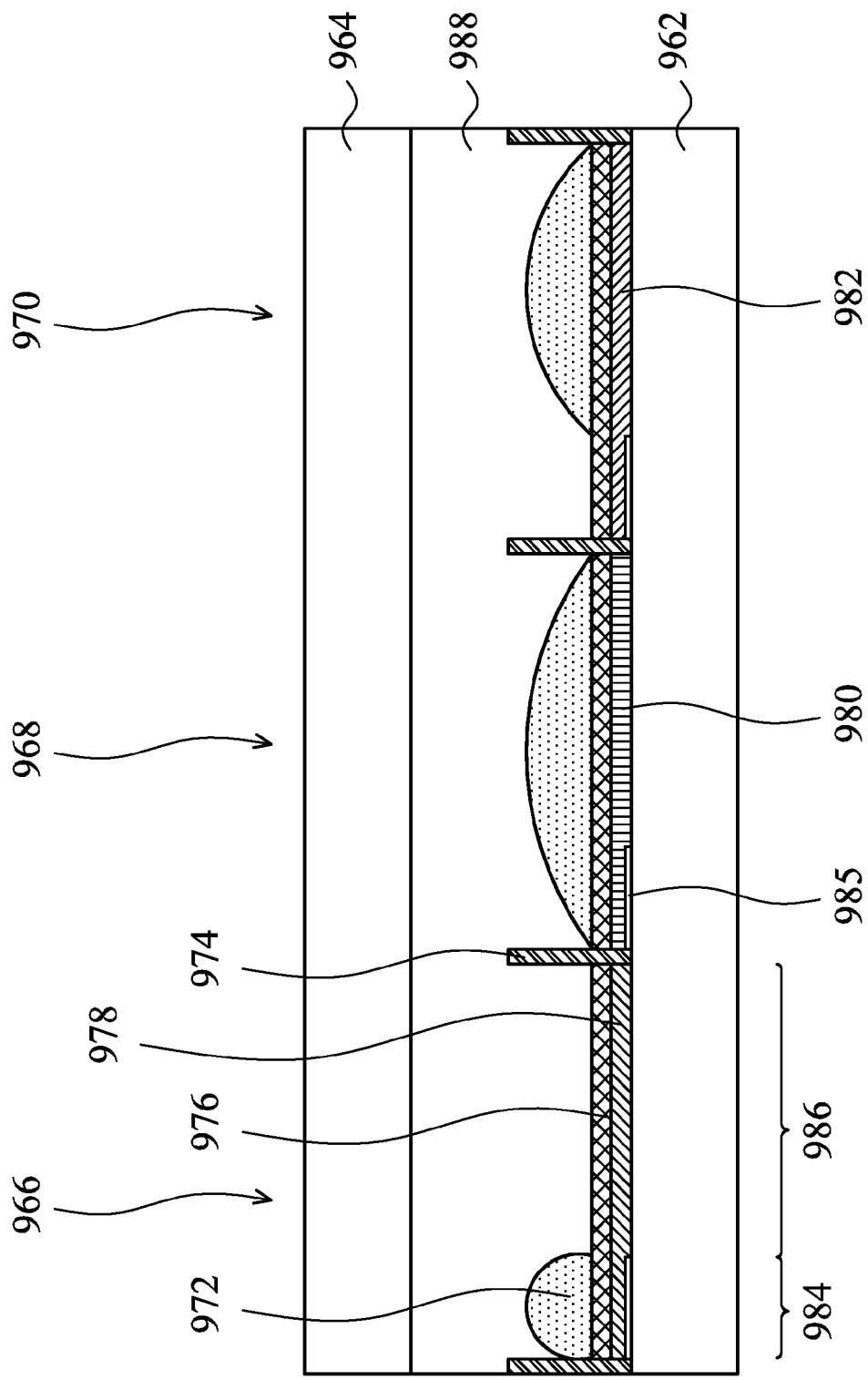
FIG. 9C shows a dual display of further another embodiment of the invention.

FIG. 9C shows a dual display of another embodiment of the invention. The embodiment uses color filters as color elements, and opaque fluids, such as black fluids, are used as light shutters. Referring to FIG. 9C, a first substrate 962 and a second substrate 964 opposite the first substrate 962 are provided. The first substrate 962 and the second substrate 964 can be formed of transparent material, such as glass. Hydrophilic walls 974 are disposed on the first substrate 962 to separate the subpixels of the dual display. Each subpixel comprises a transmissive region 986 and a reflective region 984, wherein a reflective electrode 985 is formed on the inner surface of the first substrate 962 in the reflective region 984. A first color filter layer 978 is disposed on the reflective electrode 985 and the first substrate 962 in the first subpixel 966, a second color filter layer 980 is disposed on the reflective electrode 985 and the first substrate 962 in the second subpixel 968, and a third color filter layer 982 is disposed on the reflective electrode 985 and the first substrate 962 in the third subpixel 970. A transparent electrode 976 is formed on each color filter layer. In the embodiment, the transparent electrode 976 is preferably formed of transparent material, such as ITO, IZO or ZnO, and the reflective electrode 985 is preferably formed of high reflectivity metal material, such as aluminum. For improving image qualities, the reflective region 984 further comprising a black resin (not shown) under the reflective electrode 985. The first, second and third color filter layers 978, 980, 982 are preferably formed of color resins. For example, first color filter layer 978 can be red, the second color filter layer 980 can be green and the third color filter layer 982 can be blue. A black fluid 972 is controlled on the transparent electrode 976 in each subpixel to act as a light shutter. For example, the black fluid 972 can shrink over the reflective region 984, expand over the entire subpixel or only cover the transmissive region 986. The embodiment sets the color filter layer on the first substrate 962. The invention is not limited thereto. The color filter layer can be on the second substrate 964 in another embodiment.

Figure 9D:
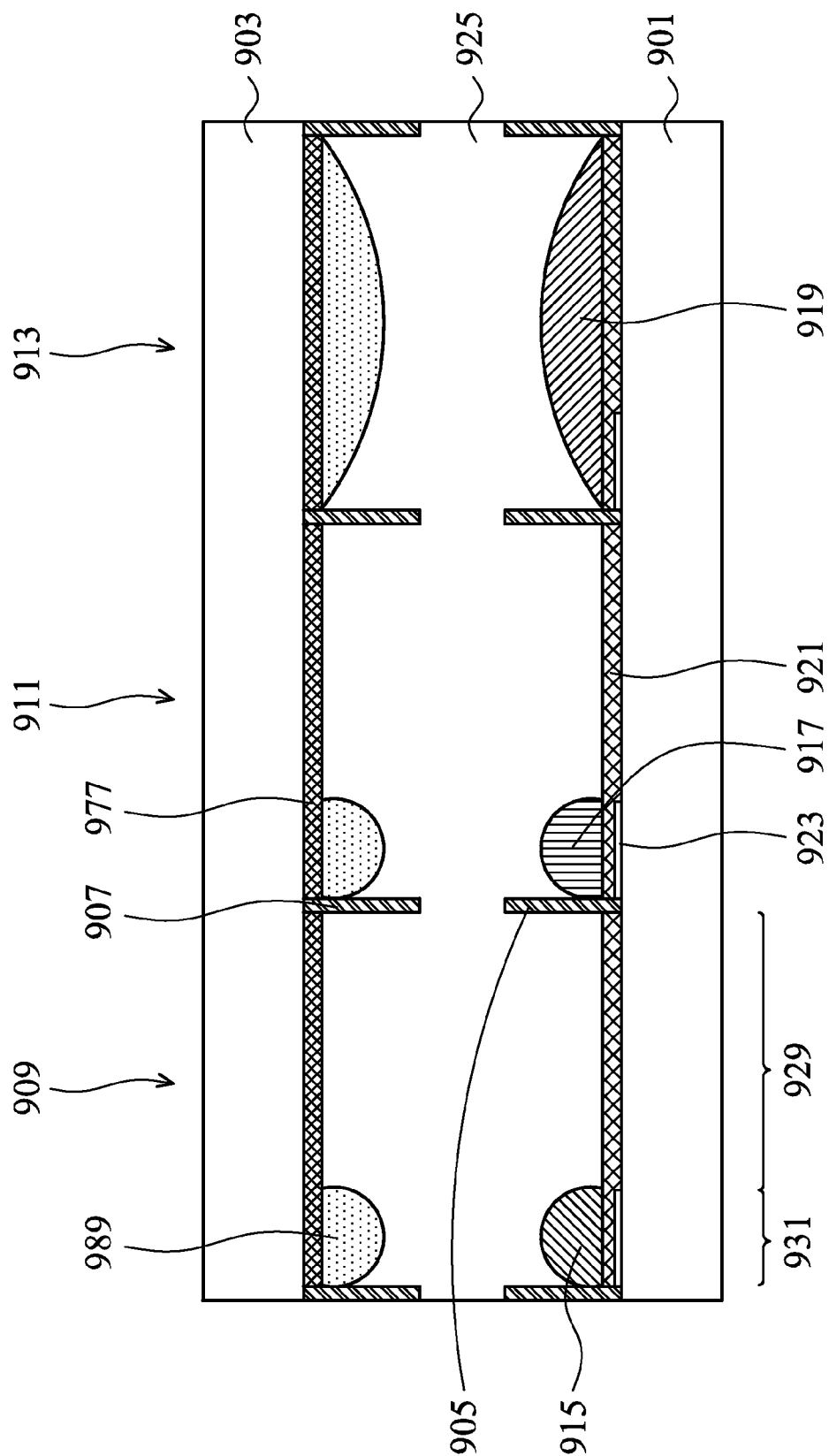
FIG. 9D shows a dual display of further another embodiment of the invention.

FIG. 9D shows a dual display of another embodiment of the invention. The opaque fluids acting as light shutter are disposed on the second substrate in the embodiment. Referring to FIG. 9D, a first substrate 901 and a second substrate 903 opposite to the first substrate 901 are provided. The first substrate 901 and the second substrate 903 can be formed of transparent material, such as glass. First hydrophilic walls 905 are disposed on the first substrate 901 to separate the subpixels of the dual display. Each subpixel comprises a transmissive region 929 and a reflective region 931, wherein a first transparent electrode 921 is formed on an inner surface of the first substrate 901 in the transmissive region 929 (or in both of the transmissive and reflective regions) and a reflective electrode 923 is formed on the inner surface of the first substrate 901 in the reflective region 931. In the embodiment, the first transparent electrode 921 is preferably formed of transparent material, such as ITO, IZO or ZnO, and the reflective electrode 923 is preferably formed of high reflectivity metal material, such as aluminum. For improving image qualities, the reflective region 931 further comprising a black resin (not shown) under the reflective electrode 923. A polar liquid 925 is interposed between the first substrate 901 and the second substrate 903. In the embodiment, a pixel is separated into three subpixels, comprising a first subpixel 909, a second subpixel 911 and a third subpixel 913. For example, the first subpixel 909 can be red, the second subpixel 911 can be green, and the third subpixel 913 can be blue. A first color fluid 915 which is movable by an electrical field is controlled in the first subpixel 909, which can expand over the transparent electrode 921 and the reflective electrode 923, or shrink on the reflective region 931. A second color fluid 917 is controlled in the second subpixel 911, and a third color fluid 919 is controlled in the third subpixel 913. A second transparent electrode 977 is disposed on the inner surface of the second substrate 903 in each subpixel. Second hydrophilic walls 907 are disposed on the second substrate 903 for separation of the subpixels. An opaque/black fluid 989 is controlled on the second transparent electrode 977 in each subpixel to act as a light shutter. For example, the opaque/black fluid can shrink over the reflective region 931, expand over the entire subpixel or only cover the transmissive region 929.

Figure 9E:
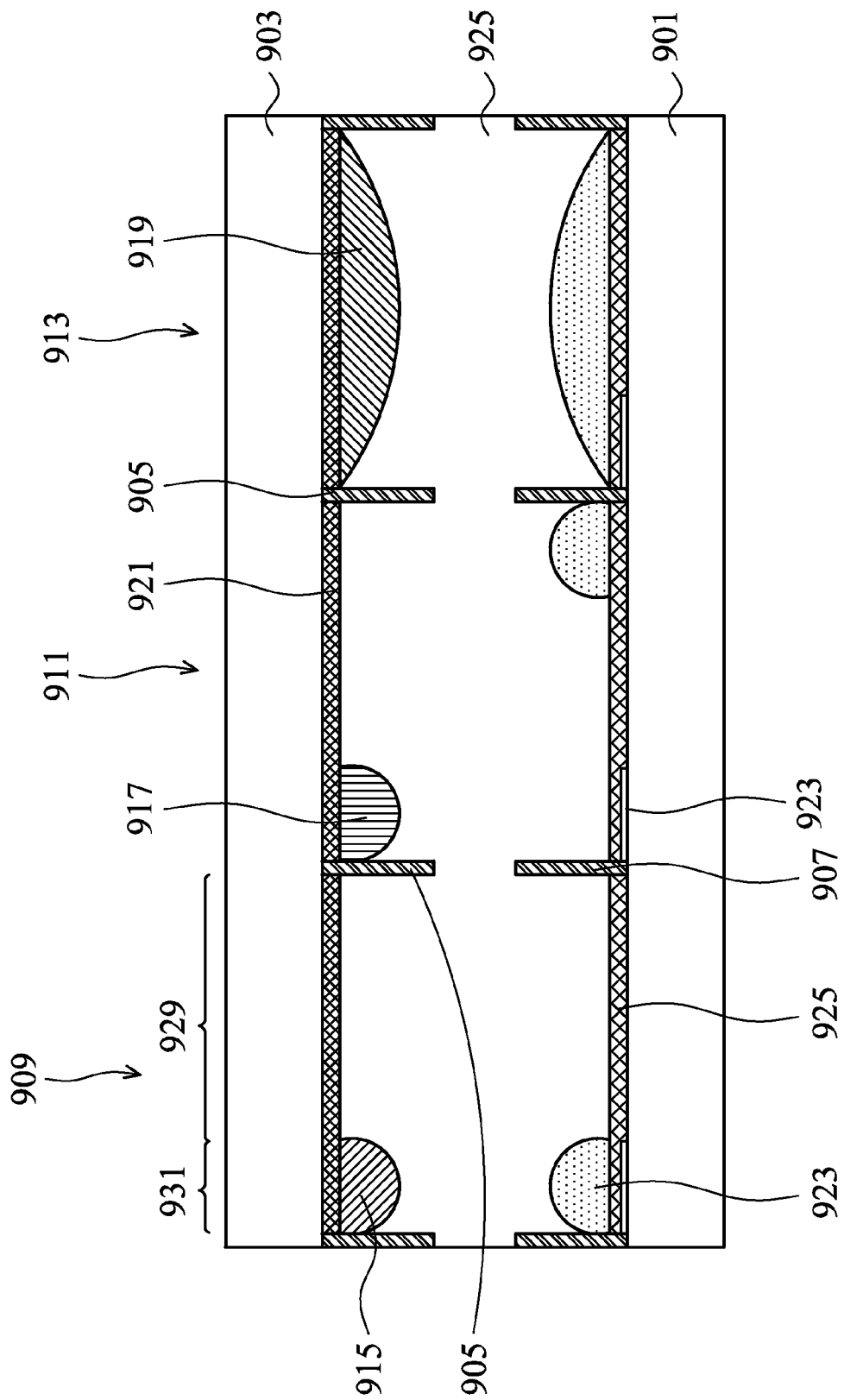
FIG. 9E shows a dual display of further another embodiment of the invention.

FIG. 9E shows a dual display of another embodiment of the invention. The dual display of the FIG. 9E sets the first, second and third color fluids 915, 917, 919 on the second substrate 903, and the opaque/black fluids 989 on the first substrate 901. The other elements are similar as the embodiment shown in FIG. 9D, and thus are not described again.

A first operating mechanism of a dual display of an embodiment of the invention under a reflective mode is illustrated in accordance with FIG. 10A and FIG. 10B. FIG. 10A shows a top view of a pixel and FIG. 10B shows a cross section of a pixel. The viewing side 991 is over the second substrate 904. Referring to FIG. 10A and FIG. 10B, the first color fluid 910, the second color fluid 912 and the third color fluid 914 are controlled to be on the reflective region 908. The transmissive region 906 is light transmissive. The dual display panel is transparent under this operating mechanism of FIG. 10A and FIG. 10B.

Figure 11A:
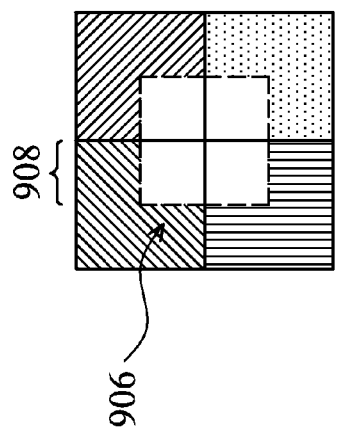
FIG. 11A and FIG. 11B illustrate a second operating mechanism of a dual display of an embodiment of the invention under a reflective mode.
Figure 11B:
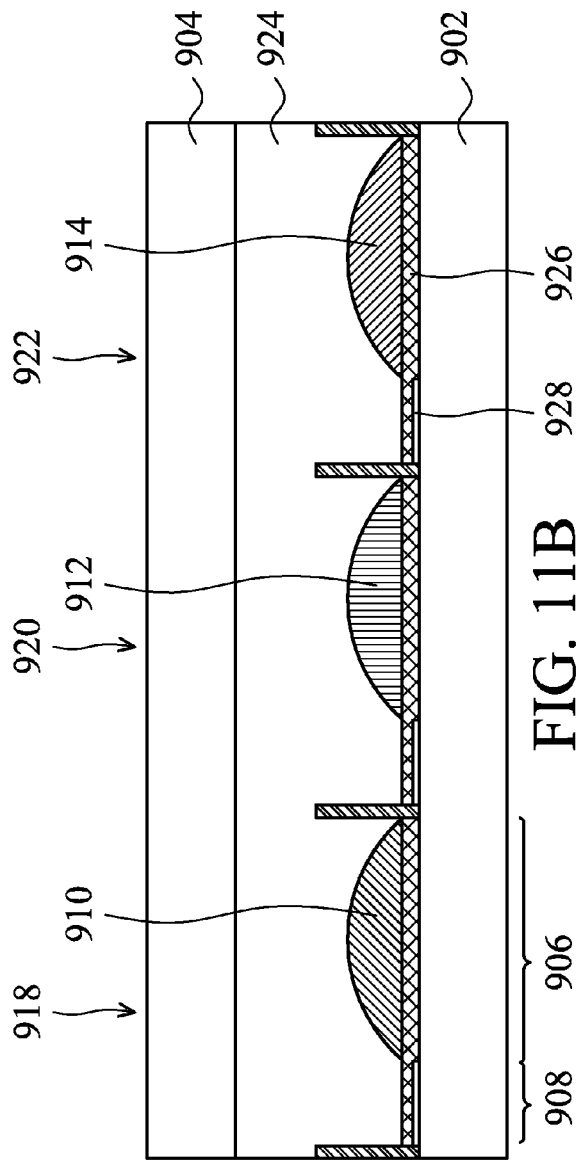

A second operating mechanism of a dual display of an embodiment of the invention under a reflective mode is illustrated in accordance with FIG. 11A and FIG. 11B. FIG. 11A shows a top view of a pixel and FIG. 11B shows a cross section of a pixel. The viewing side 991 is over the second substrate 904. Referring to FIG. 11A and FIG. 11B, the first color fluid 910 and the second color fluid 912 and the third color fluid 914 are controlled to be on the transmissive region 906 to expose the reflective electrode 928 to reflect incident light. The dual display panel presents a white color under this operating mechanism of FIG. 11A and FIG. 11B.

Figures 12A, 12B:
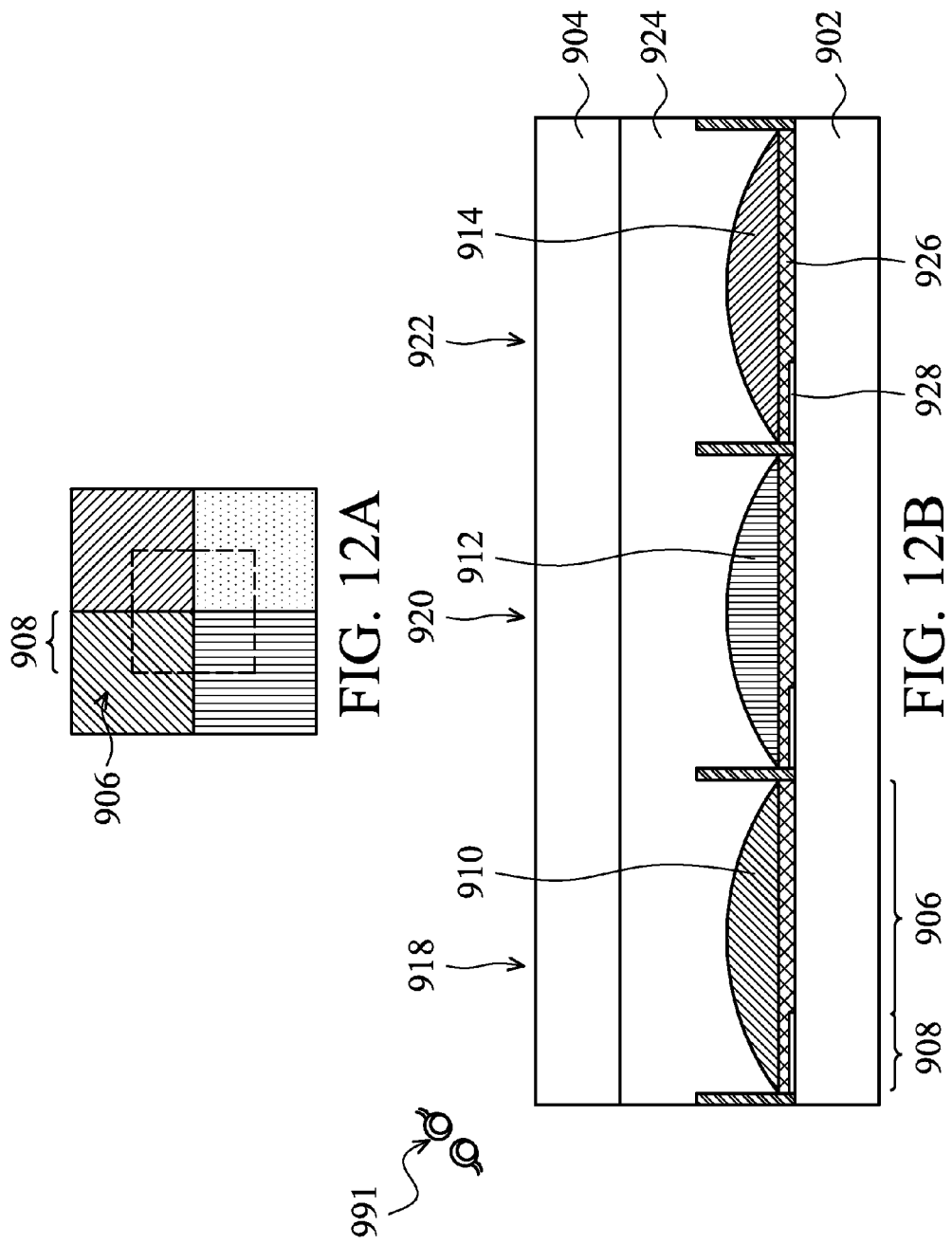
FIG. 12A and FIG. 12B illustrate a third operating mechanism of a dual display of an embodiment of the invention under a reflective mode.

A third operating mechanism of a dual display of an embodiment of the invention under a reflective mode is illustrated in accordance with FIG. 12A and FIG. 12B. FIG. 12A shows a top view of a pixel and FIG. 12B shows a cross section of a pixel. The viewing side 991 is over the second substrate 904. Referring to FIG. 12A and FIG. 12B, the first color fluid 910, the second color fluid 912 and the third color fluid 914 are controlled to be on the transmissive region 906 and the reflective region 908. The dual display panel presents a black or dark color under this operating mechanism of FIG. 12A and FIG. 12B.

Figures 13A, 13B:
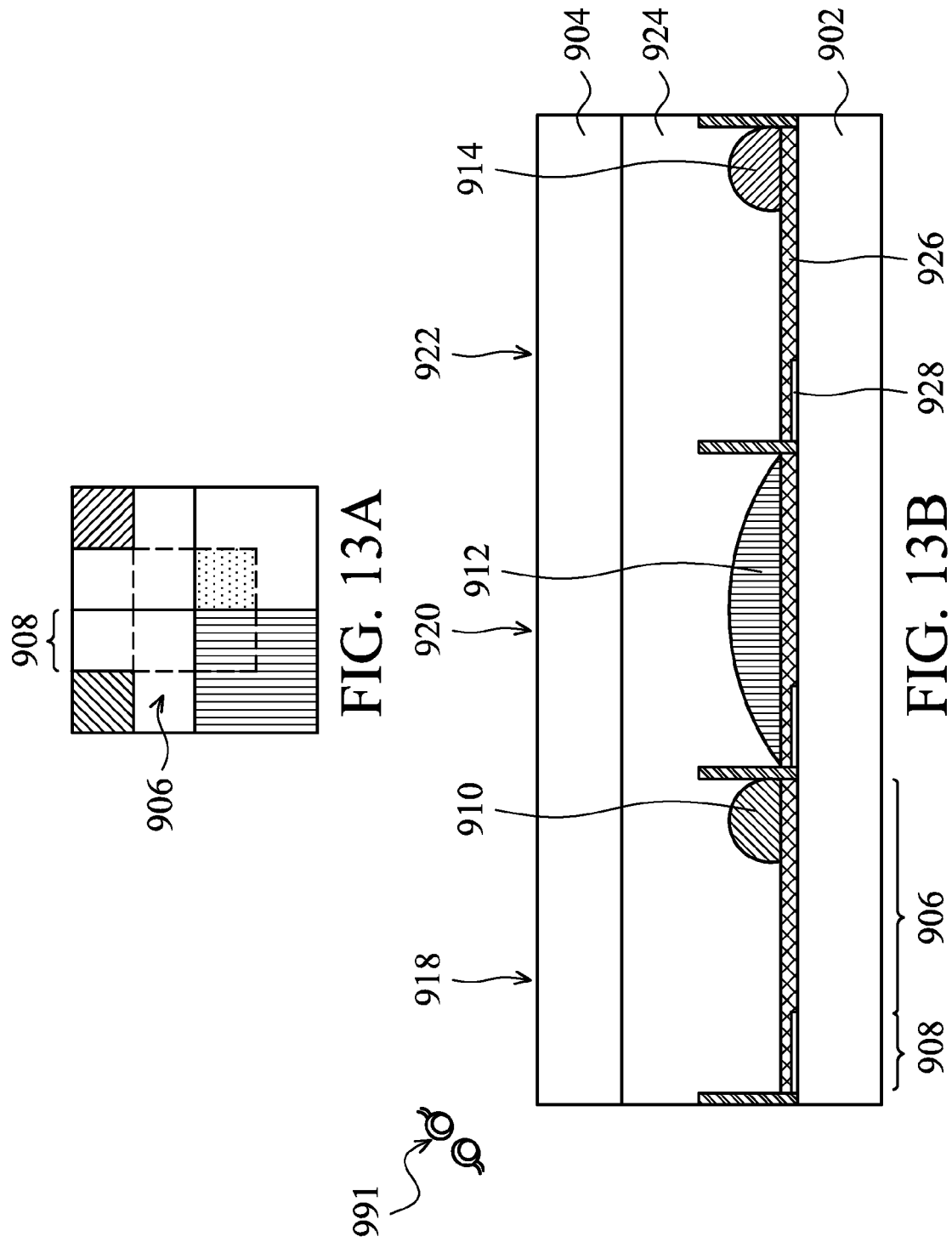
FIG. 13A and FIG. 13B illustrate a fourth operating mechanism of a dual display of an embodiment of the invention under a reflective mode.

A fourth operating mechanism of a dual display of an embodiment of the invention under a reflective mode is illustrated in accordance with FIG. 13A and FIG. 13B. FIG. 13A shows a top view of a pixel and FIG. 13B shows a cross section of a pixel. The viewing side 991 is over the second substrate 904. Referring to FIG. 13A and FIG. 13B, the first color fluid 910, the third color fluid 914 are controlled to shrink on a portion of the transmissive region 906. The second color fluid 912 expands to cover the transmissive region 906 and the reflective region 908. The dual display panel presents a single color (the second color) under this operating mechanism of FIG. 13A and FIG. 13B.

Figure 14A:
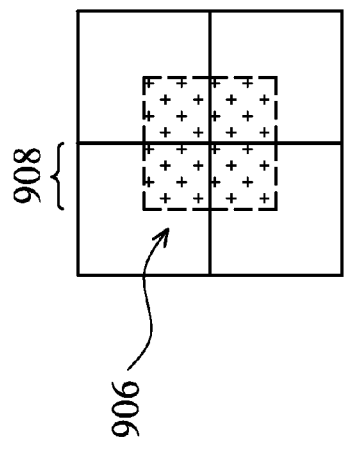
FIG. 14A and FIG. 14B illustrate a first operating mechanism of a dual display of an embodiment of the invention under a transmissive mode.
Figure 14B:
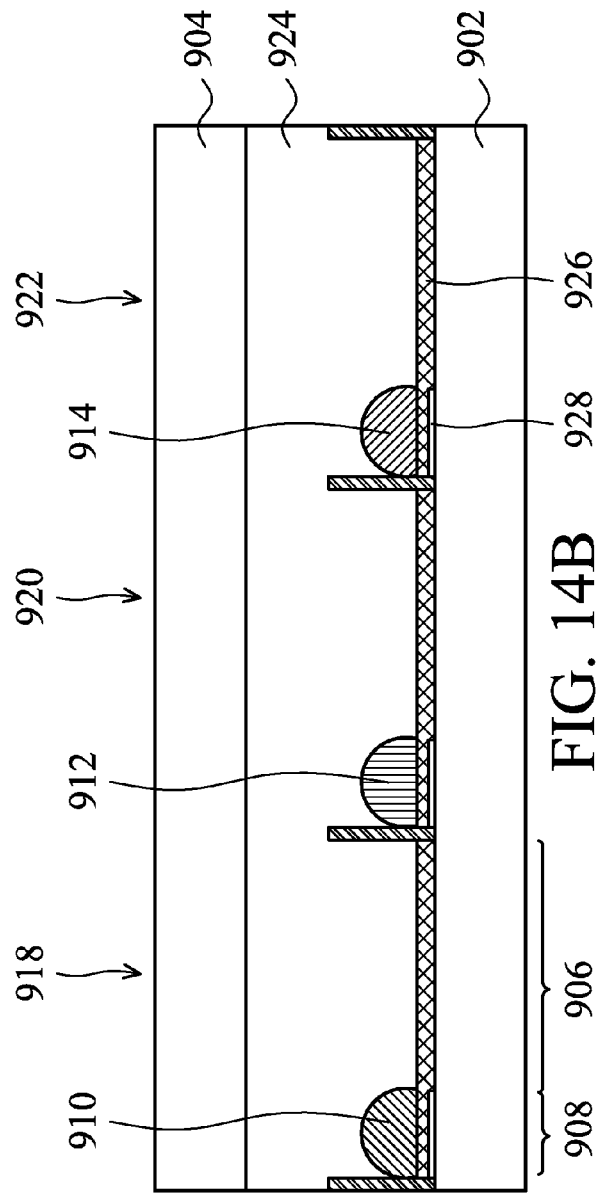

A first operating mechanism of a dual display of an embodiment of the invention under a transmissive mode is illustrated in accordance with FIG. 14A and FIG. 14B. FIG. 14A shows a top view of a pixel and FIG. 14B shows a cross section of a pixel. The viewing side 993 is under the first substrate 902. Referring to FIG. 14A and FIG. 14B, the first color fluid 910, the second color fluid 912 and the third color fluid 914 are controlled to be on the reflective region 908. The transmissive region 906 is light transmissive. The dual display panel is transparent under this operating mechanism of FIG. 14A and FIG. 14B.

A second operating mechanism of a dual display of an embodiment of the invention under a transmissive mode is illustrated in accordance with FIG. 15A and FIG. 15B. FIG. 15A shows a top view of a pixel and FIG. 15B shows a cross section of a pixel. The viewing side 993 is under the first substrate 902. Referring to FIG. 15A and FIG. 15B, the first color fluid 910, the second color fluid 912 and the third color fluid 914 are controlled to be on the transmissive region 906 and the reflective region 908. The dual display panel presents a gray color under this operating mechanism of FIG. 15A and FIG. 15B.

A third operating mechanism of a dual display of an embodiment of the invention under a transmissive mode is illustrated in accordance with FIG. 16A and FIG. 16B. FIG. 16A shows a top view of a pixel and FIG. 16B shows a cross section of a pixel. The viewing side 993 is under the first substrate 902. Referring to FIG. 16A and FIG. 16B, the first color fluid 910, the second color fluid 912 and the third color fluid 914 are controlled to be on the transmissive region 906 to expose the reflective electrode 928. The dual display panel presents a deeper color (black color) under this operating mechanism of FIG. 16A and FIG. 16B when compared with FIG. 15A and FIG. 15B.

A fourth operating mechanism of a dual display of an embodiment of the invention under a transmissive mode is illustrated in accordance with FIG. 17A and FIG. 17B. FIG. 17A shows a top view of a pixel and FIG. 17B shows a cross section of a pixel. The viewing side 993 is under the first substrate 902. Referring to FIG. 17A and FIG. 17B, the first color fluid 910 and the second color fluid 912 are controlled to shrink on the reflective region 908. The third color fluid 914 expands to cover the transmissive region 906. The dual display panel presents a single color (the third color) under this operating mechanism of FIG. 17A and FIG. 17B.

Figure 18B:
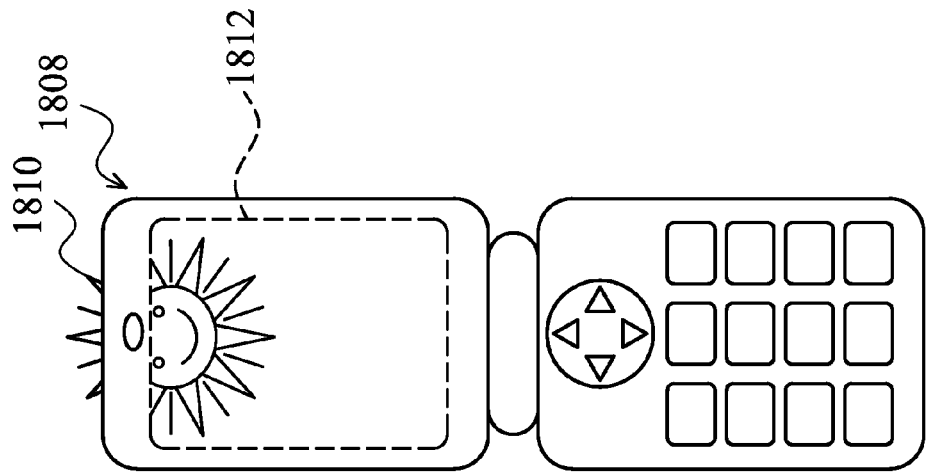
FIG. 18B shows an application of a dual display of the embodiment under a transmissive mode.
Figure 18A:
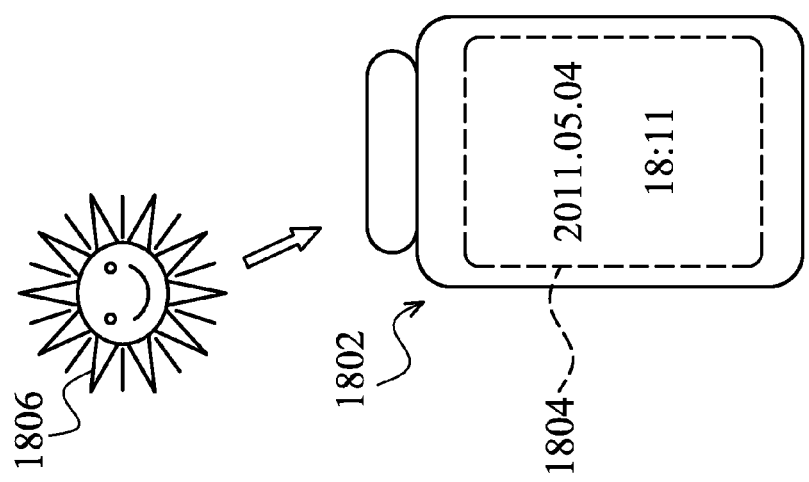
FIG. 18A shows an application of a dual display of the embodiment under a reflective mode.
Figure 19B:
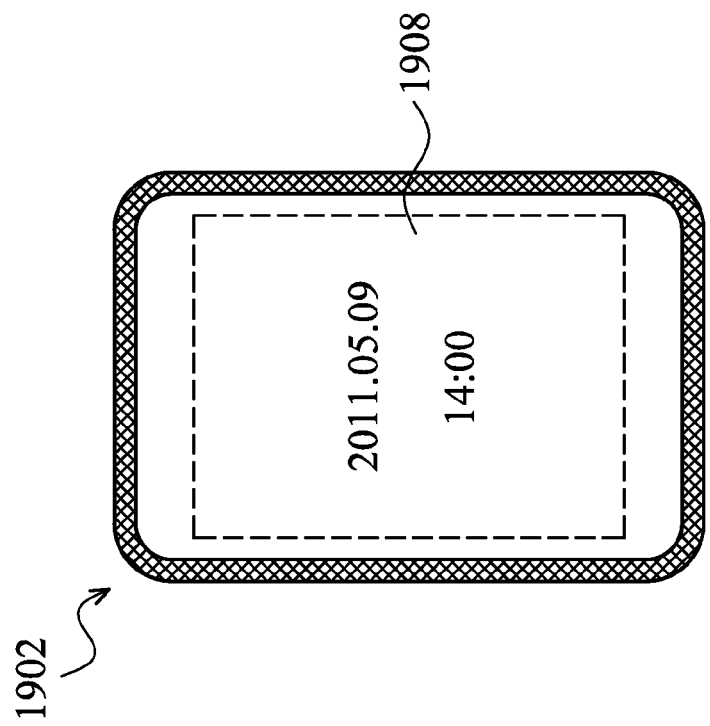
FIG. 19A and FIG. 19B show another application of a dual display of the embodiment under a reflective mode.
Figure 19A:
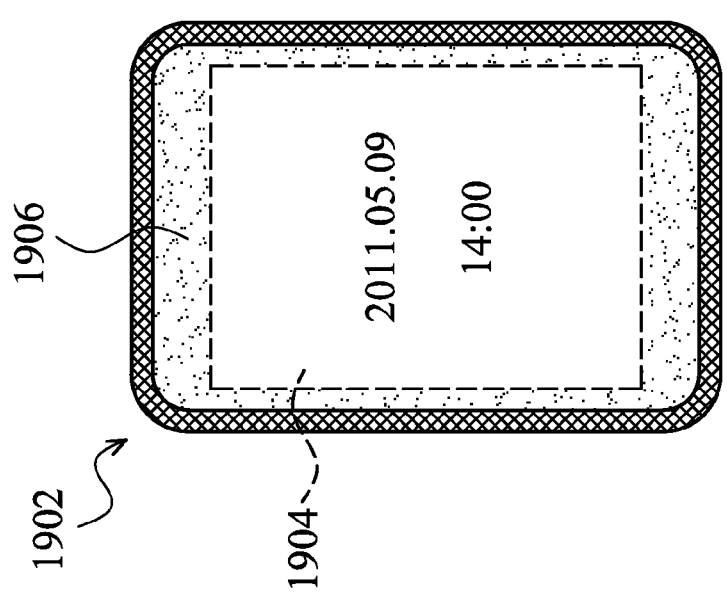

FIG. 18A shows an application of a dual display of the embodiment under a reflective mode. Referring to FIG. 18A, the dual display 1804 can be used in a flip or fold phone 1802, wherein viewers can see signatures, symbols and characters under a reflective mode with ambient light 1806 as a light source. Color of the dual display 1804 can be changed, or the dual display 1804 can be transparent. FIG. 18B shows an application of a dual display of the embodiment under a transmissive mode. Referring to FIG. 18B, the dual display 1812 can be used as a display of a flip or fold phone 1808, wherein ambient light 1810 or a front light module assembled in the phone is used as a light source. This dual display 1812 can display a higher resolution under a transmissive mode than under a reflective mode, wherein the reflective region occupies a small area of a pixel (for example, ¼ area of a subpixel). FIG. 19A and FIG. 19B show another application of a dual display of the embodiment under a reflective mode. Referring to FIG. 19A, the dual display 1904 can be used in a smart phone 1902, wherein a viewer can see the dual display 1904 from the backside under a reflective mode. The dual display 1904 can be selectively driven at different regions to show a frame pattern 1906, as shown in FIG. 19A, or a dual display 1904 can be transparent in the whole display, as shown in FIG. 19B. The frame pattern 1906 is adjustable on user's demand.

Figure 20B:
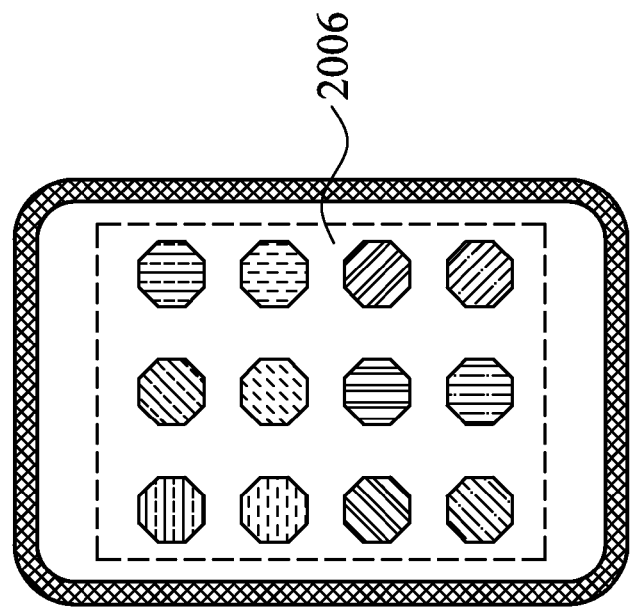
FIG. 20A and FIG. 20B show another application of a dual display of the embodiment under a transmissive mode.
Figure 20A:
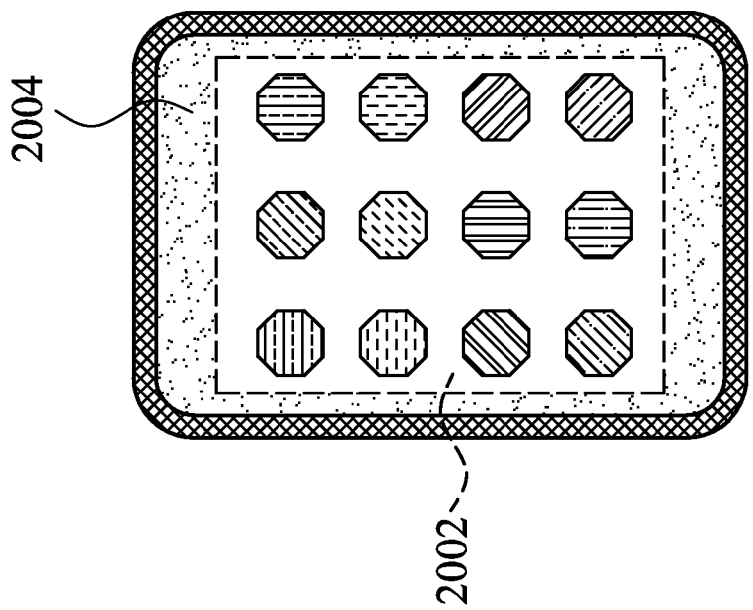

FIG. 20A and FIG. 20B show another application of a dual display of the embodiment under a transmissive mode. Referring to FIG. 20A, the dual display 2002 can be used in a smart phone, wherein a viewer can see the dual display 2002 from the front side under a transmissive mode. The dual display 2002 can be selectively driven at different regions to show a frame pattern 2004, as shown in FIG. 20A, or a dual display 2006 can be transparent in the whole display, as shown in FIG. 20B.

FIG. 21A~FIG. 21C show yet another application of a dual display of the embodiment, wherein the dual display can be used on a window of a building or on a display window of a store. Referring to FIG. 21A, when a viewer 2106 is disposed on the outside of the building 2102 and an ambient light 2103 is provided on the outside of the building 2102, the dual display 2104 presents patterns to the viewer under a reflective mode. Referring to FIG. 21B, when a viewer 2106 is disposed on the inside of the building 2102, the dual display 2104 presents patterns to the viewer 2106 under a reflective mode. Referring to FIG. 21C, when a viewer 2106 is disposed on the outside of the building 2102 and a light bulb 2108 on the inside of the building 2102 is turned on, the dual display 2104 presents patterns to the viewer 2106 under a reflective mode and transmissive mode.

While the invention has been described by way of example and in terms of the preferred embodiments, it is to be understood that the invention is not limited to the disclosed embodiments. For example, the described first and second electrowetting display devices are not limited to an electrowetting display device, but can be replaced with other display devices which can be switched to a transmissive mode or reflective mode, such as a cholesteric liquid crystal display device, electrophoretic display device or electrochromic display device. In addition, the reflection transmission switching device between the first and second display devices is not limited only to a polymer dispersed liquid crystal device or an electrowetting display device, but can also be an electrochromic display device. The invention is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dual display, comprising:
   a first substrate and a second substrate comprising a plurality of pixels, wherein each pixel comprises a plurality of subpixels, and the first substrate comprises a reflective region and a transmissive region for each subpixel;
   a first color fluid movable by a first electric field on the reflective region and the transmissive region of a first subpixel, wherein when the first color fluid covers the transmissive region, the dual display provides a first viewing side at the first substrate side under a transmissive mode, and
   when the first color fluid covers the reflective region or covers the reflective region and the transmissive region, the dual display provides a second viewing side at the second substrate side under a reflective mode.

2. The dual display as claimed in claim 1, wherein the first color fluid is selected from the group consisting of RGB, CMY, RGBK or CMYK.

3. The dual display as claimed in claim 1, further comprising a second color fluid movable on the reflective region and the transmissive region of a second subpixel and a third color fluid movable on the reflective region and the transmissive region of a third subpixel.

4. The dual display as claimed in claim 3, wherein when the first color fluid covers the reflective region of the first subpixel, the second color fluid covers the reflective region of the second subpixel and the third color fluid covers the reflective region of the third subpixel, the dual display presents transparent from the second viewing side under the reflective mode.

5. The dual display as claimed in claim 3, wherein when the first color fluid covers the transmissive region of the first subpixel, the second color fluid covers the transmissive region of the second subpixel and the third color fluid covers the transmissive region of the third subpixel, the dual display presents a white color from the second viewing side under the reflective mode.

6. The dual display as claimed in claim 3, wherein when the first color fluid covers the reflective region and the transmissive region of the first subpixel, the second color fluid covers the reflective region and the transmissive region of the second subpixel and the third color fluid covers the reflective region and the transmissive region of the third subpixel, the dual display presents a black/dark color from the second viewing side under the reflective mode.

7. The dual display as claimed in claim 3, wherein when the first color fluid shrinks on the transmissive region of the first subpixel, the second color fluid covers the reflective region and/or the transmissive region of the second subpixel and the third color shrinks on the transmissive region of the third subpixel, the dual display presents color of the second subpixel from the second viewing side under the reflective mode.

8. The dual display as claimed in claim 3, wherein when the first color fluid covers the reflective region of the first subpixel, the second color fluid covers the reflective region of the second subpixel and the third color fluid covers the reflective region of the third subpixel, the dual display presents transparent from the first viewing side under the transmissive mode.

9. The dual display as claimed in claim 3, wherein when the first color fluid covers the reflective region and the transmissive region of the first subpixel, the second color fluid covers the reflective region and the transmissive region of the second subpixel and the third color fluid covers the reflective region and the transmissive region of the third subpixel, the dual display presents a gray color from the first viewing side under the transmissive mode.

10. The dual display as claimed in claim 3, wherein when the first color fluid covers the transmissive region of the first subpixel, the second color fluid covers the transmissive region of the second subpixel and the third color fluid covers the transmissive region of the third subpixel, the dual display presents a black/dark color from the first viewing side under the transmissive mode.

11. The dual display as claimed in claim 3, wherein when the first color fluid shrinks on the reflective region of the first subpixel, the second color fluid shrinks on the reflective region of the second subpixel and the third color fluid covers the transmissive region of the third subpixel, the dual display presents the color of the third subpixel from the first viewing side under the transmissive mode.

12. The dual display as claimed in claim 1, further comprising an opaque fluid movable by a second electric field disposed on an inner surface of the second substrate.

13. The dual display as claimed in claim 1, wherein the first color fluid is disposed on an inner surface of the second substrate, and the dual display further comprises an opaque fluid movable by a second electric field disposed on an inner surface of the first substrate.

14. A dual display, comprising:
   a first substrate and a second substrate comprising a plurality of pixels, wherein each pixel comprises a plurality of subpixels, and the first substrate comprises a reflective region and a transmissive region for each subpixel;
   a color filter layer disposed on the reflective region and the transmissive region;
   an opaque fluid movable by an electric field on the reflective region and the transmissive region of a first subpixel, wherein when the opaque fluid covers the reflective region, the dual display provides a first viewing side at the first substrate side under a transmissive mode, and when the opaque fluid covers the transmissive region, the dual display provides a second viewing side at the second substrate side under a reflective mode.

15. The dual display as claimed in claim 14, wherein the color filter layer is disposed on the first substrate.

16. The dual display as claimed in claim 14, wherein the color filter layer is disposed on the second substrate.

* * * * *